United States Patent
Uchibayashi et al.

(10) Patent No.: US 7,437,009 B2
(45) Date of Patent: Oct. 14, 2008

(54) IMAGE CODING APPARATUS, IMAGE CODING METHOD, AND IMAGE CODING PROGRAM FOR CODING AT LEAST ONE STILL FRAME WITH STILL FRAME CODING HAVING A HIGHER QUALITY THAN NORMAL FRAME CODING OF OTHER FRAMES

(75) Inventors: Kyoko Uchibayashi, Hirakata (JP); Makoto Hagai, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1094 days.

(21) Appl. No.: 10/341,350

(22) Filed: Jan. 14, 2003

(65) Prior Publication Data
US 2003/0133169 A1 Jul. 17, 2003

(30) Foreign Application Priority Data
Jan. 16, 2002 (JP) ............................ 2002-007868

(51) Int. Cl.
*G06K 9/36* (2006.01)
(52) U.S. Cl. ..................................... 382/239
(58) Field of Classification Search .................. 382/239
See application file for complete search history.

(56) References Cited

U.S. PATENT DOCUMENTS

| | | | |
|---|---|---|---|
| 5,142,362 A * | 8/1992 | Masera et al. .......... | 375/240.01 |
| 5,557,330 A | 9/1996 | Astle | |
| 5,737,537 A | 4/1998 | Gardos et al. | |
| 5,754,700 A * | 5/1998 | Kuzma ....................... | 382/236 |
| 6,201,896 B1 | 3/2001 | Ishikawa | |
| 6,259,736 B1 * | 7/2001 | Chujoh et al. .......... | 375/240.13 |
| 6,292,589 B1 | 9/2001 | Chow et al. | |
| 6,507,616 B1 * | 1/2003 | Ryu ....................... | 375/240.13 |
| 6,785,331 B1 * | 8/2004 | Jozawa et al. .......... | 375/240.12 |
| 6,895,048 B2 * | 5/2005 | Boice et al. ............ | 375/240.02 |

(Continued)

FOREIGN PATENT DOCUMENTS

EP 0 444 660 9/1991

(Continued)

OTHER PUBLICATIONS

Steven MaCanne et al., "Low-Complexity Video Coding for Receiver-Driven Layered Multicast", IEEE Journal on Selected Areas in Communications, IEEE Inc. New York, US, vol. 15, No. 6, Aug. 1997.

(Continued)

*Primary Examiner*—Wenpeng Chen
(74) *Attorney, Agent, or Firm*—Wenderoth, Lind & Ponack, L.L.P.

(57) ABSTRACT

An image coding apparatus includes a still frame coding judgment unit for judging whether a target frame to be coded is a still frame or not from a difference value between the target frame and an immediately previous reference frame, and a quantization parameter control unit for performing control of a quantization parameter value to be used for coding, on an initial one frame at which an image starts to come into a standstill, wherein the initial frame is subjected to coding with less coding error as compared with coding for other frames.

9 Claims, 17 Drawing Sheets

U.S. PATENT DOCUMENTS

2001/0001614 A1* 5/2001 Boice et al. ............ 375/240.24
2002/0059643 A1* 5/2002 Kitamura et al. ............ 725/136
2003/0133169 A1* 7/2003 Uchibayashi et al. .. 358/426.07

FOREIGN PATENT DOCUMENTS

| EP | 0 933 948 | 8/1999 |
|---|---|---|
| JP | 8-17491 | 2/1996 |
| JP | 2000-125301 | 4/2000 |
| JP | 2000-188735 | 7/2000 |

OTHER PUBLICATIONS

T. Wiegand, "H.26L Test Model Long-Term No. 9 (TML-9) draft0", ITU-T Telecommunications Standardization Sector of ITU, Geneva, CH, Dec. 21, 2001, pp. 1, 3-75.

* cited by examiner

Y : mean absolute value of inter-frame difference of target frame
THRa: THRa=constant
FLAG: flag for judging coding of still frame QP : quantization parameter used for coding of target frame
QPinput : externally supplied quantization parameter
β : $0 < \beta < 1$

| THRskip | : threshold value for judging target macroblock |
| --- | --- |
| THRskip_base | : THRskip_base=constant |
| X | : means absolute value of inter-frame difference of target macroblock |
| $\gamma$ | : $0 < \gamma < 1$ |

QP : quantization parameter used for coding of target macroblock
QPinput : externally supplied quantization parameter
ε : $0 < ε < 1$ THRc: the number of all macroblocks in target frame × $\delta$
($\delta$ : $0 < \delta < 1$)
F : the number of macroblocks in target frame, whose flags are 1 flag 0 : non skip macroblock
flag 1 : skip macroblock which has not been subjected to still frame coding
flag 2 : skip macroblock which has already been subjected to still frame coding QP : quantization parameter used for coding of target macroblock
QPinput : externally supplied quantization parameter
$\varepsilon$ : $0 < \varepsilon < 1$
$\zeta$ : $0 < \zeta$ THR_H : quantization parameter × $\alpha 1$ $(0 < \alpha 1 < 1)$
THR_L : quantization parameter × $\alpha 2$ $(0 < \alpha 2 < \alpha 1)$
X : mean absolute value of differential value of target macroblock THRc: the number of all macroblocks in target frame × δ
  (δ : 0 < δ < 1)
F : the number of macroblocks in target frame, whose flags are 1

THR_L : quantization parameter × α2 (0 < α2 < α1)
X : mean absolute value of differential value of target macroblock

IMAGE CODING APPARATUS, IMAGE CODING METHOD, AND IMAGE CODING PROGRAM FOR CODING AT LEAST ONE STILL FRAME WITH STILL FRAME CODING HAVING A HIGHER QUALITY THAN NORMAL FRAME CODING OF OTHER FRAMES

FIELD OF THE INVENTION

The present invention relates to an image coding apparatus, an image coding method, and an image coding program and, more particularly, to those for specifying a still frame among target frames to be coded, and coding the still frame with high image quality.

BACKGROUND OF THE INVENTION

In order to store or transmit a digital image with high efficiency, it is necessary to compressively coding the digital image. As a method for compressively coding a digital image, there is a waveform coding method such as subband coding, wavelet coding, or fractal coding, besides discrete cosine transform (DCT). In coding an image, the image is compressed by removing redundant data within a frame when the image has similar portions within the frame, or by removing redundant data between frames, such as still portions, from continuous display frames, and then the compressed image is coded.

As a method for removing redundant information within a frame, there is a method called intra-frame prediction. In this method, a difference between a portion to be coded and an adjacent portion that has already been coded is obtained to express the portion to be coded as a difference signal, and this difference signal is subjected to waveform coding.

Further, as a method for removing redundant image information between adjacent frames, there is a method of performing inter-frame prediction using motion compensation. In this method, a difference between a pixel value of a pixel in a current frame and a pixel value of a pixel in a previous frame is obtained to express the pixel in the current frame as a difference signal, and this difference signal is subjected to waveform coding.

An example of a conventional image predictive coding apparatus using the above-described method of performing inter-frame prediction will be described with reference to FIG. 16. FIG. 16 is a block diagram illustrating the construction of a typical image coding apparatus 1500.

With reference to FIG. 16, the image coding apparatus 1500 comprises a blocking unit 1 for dividing an input image into plural macroblocks each having a size of 16×16 pixels; a subtracter 2 for calculating a difference value s1 between a target macroblock to be coded and a predictive macroblock corresponding to the target macroblock; a switch 3 which is turned ON and OFF according to a judgement result from a skip macroblock judgement unit 4; a skip macroblock judgement unit 4 for judging whether the target macroblock is a skip macroblock to be replaced with a macroblock at the same position in a just previous frame, or the difference value s1 should be coded, according to an absolute value of the difference value s1 and a quantization parameter supplied from the outside, and turning ON or OFF the switch 3 according to a judgement result; a compressive coding unit 5 for compressively coding the difference value s1; a local decoding unit 9 for performing local decoding on the basis of a quantization factor outputted from the compressive coding unit 5; and a local predictive image generation unit 12 for generating a predictive macroblock from the output of the local decoding unit 9.

The compressive coding unit 5 comprises a frequency converter 6 for converting the difference value s1 into a frequency domain signal; a quantizer 7 for quantizing the output of the frequency converter 6 using the quantization parameter supplied from the outside; and a variable-length encoder 8 for variable-length coding the output of the quantizer 7 (quantization factor), or multiplexing a skip macroblock signal s2 outputted from the skip macroblock judgement unit 4, with data obtained by variable-length coding a difference signal of another macroblock, and outputting a code string.

The local decoding unit 9 comprises an inverse quantizer 10 for inversely quantizing the output of the quantizer 7 (quantization factor); and an inverse frequency converter 11 for converting the output of the inverse quantizer 10 (frequency domain signal) into a space domain signal.

The local predictive image generation unit 12 comprises a frame memory 14 for holding data obtained by adding the output of the local decoding unit 9 (local decoded data) and the output of the predictive image generation unit 13 (predictive macroblock); and a predictive image generator 13 for generating a predictive macroblock.

Hereinafter, the operation of the image coding apparatus 1500 constituted as described above will be described.

An input image is divided into plural macroblocks by the blocking unit 1. Then, a difference value s1 between a target macroblock to be coded and a predictive macroblock corresponding to the target macroblock is obtained by the subtracter 3, and a judgement as to whether this macroblock is a skip macroblock or not is carried out by the skip macroblock judgement unit 4, using an absolute value of this difference value s1 and a quantization parameter supplied from the outside.

Hereinafter, the operation of the skip macroblock judgement unit 4 will be described with reference to FIG. 17. Initially, a mean absolute value X of the difference value s1 of the target macroblock, which is output from the subtracter 2, is obtained (step S1600), and the obtained mean absolute value X is compared with a threshold value THR_L which is obtained by multiplying the quantization parameter with a prescribed value (step S1601). When the mean absolute value X is larger than the threshold value THR_L, the target macroblock is judged as an inter macroblock (step S1602), and the difference value s1 is coded. When the mean absolute value X is smaller than the threshold value THR_L, the target macroblock is judged as a skip macroblock (step S1603). That is, macroblocks judged as skip macroblocks are those to be coded in the previous frame and the target frame, and their neighboring macroblocks with less motion or no notion (still macroblocks).

When the skip macroblock judgement unit 4 judges that the target macroblock is not a skip macroblock, the difference value s1 is output to the compressive coding unit 5 by the switch 3. In the compressive coding unit 5, the difference value s1 is converted into a frequency domain signal by the frequency converter 6, and the frequency domain signal is quantized by the quantizer 7 using the quantization parameter supplied from the outside. Further, the output of the quantizer 7 (quantization factor) is variable-length coded by the variable length encoder 9. The output of the quantizer 7 is locally decoded by the local decoding unit 9, and the locally decoded data is used for generation of a predictive image (predictive macroblock) by the local predictive image generation unit 12.

When the skip macroblock judgement unit 4 judges that the target macroblock is a skip macroblock, a skip macroblock signal s2 is output from the skip macroblock judgement unit 4 to the variable length encoder 8. In the variable length encoder 8, the skip macroblock signal s2 is multiplexed with data which is obtained by variable-length coding a difference signal of another macroblock, and a result is output as a code string.

In this way, a still picture is determined while coding an image, and the determined still picture is coded so as to have high image quality.

The image coding method described with respect to FIG. 16 is a one-pass coding method in which an image signal to be coded is input to an encoder only once. In this method, the target image signal can be coded immediately after the inputting, resulting in real-time coding.

In contrast with the one-pass coding method, there is a two-pass coding method in which a target image signal is once coded, and the coded signal is again coded using information of the first-time coding. Although this two-pass coding method enables coding using the information of the first-time coding, it requires a longer time for coding as compared with the one-pass coding.

The above-described conventional image coding apparatus and method are disclosed in, for example, Japanese Published Patent Applications Nos. 2000-188735 and 2000-125301.

In the conventional coding method, however, since the whole image is coded, the amount of generated codes is undesirably increased. So, by performing coding of the difference value using inter-frame prediction that has conventionally been employed, or by performing coding such that the target macroblock judged as a skip macroblock is replaced with a macroblock in the previous frame, the amount of bits generated in coding the target frame is reduced as compared with coding which does not perform inter-frame prediction. Especially, the coding process using inter-frame prediction provides a great effect in compression efficiency, for a still image or an image having many still portions.

Furthermore, according to the conventional coding method, in a still image or an image having many still portions, inter-frame residual signals are hardly generated in frames other than the first frame of the still image, leading to a problem that skip macroblocks which refer to the just-previous frame are increased. At this time, if degradation in image quality (coding error) due to coding of the first still frame is sufficiently small, an increase in image quality of the following still frames that refer to the first still frame can be expected. However, when the coding error of the first still frame is considerable, this coding error adversely affects the whole still part that refers to the first still frame, and degradation in image quality is not suppressed. In order to prevent such degradation in image quality, it is necessary to reduce the skip macroblocks, or perform quantization with a reduced quantization scale.

SUMMARY OF THE INVENTION

The present invention is made to solve the above-described problems and has for its object to provide an image coding apparatus, an image coding method, and an image coding program, which can code a still image or still portions of an image so as to provide a high image quality, while preventing an increase in the amount of codes to be generated.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image coding method for dividing a target frame to be coded into macroblocks as processing units, obtaining a difference value between the target frame and a reference frame, and coding the difference value, which method includes: a still frame judgement step of judging whether or not the target frame to be coded is a still frame that is standing still; and a high image quality coding step of subjecting at least one frame among plural frames which are judged as still frames in the still frame judgement step, to still frame coding which realizes higher image quality as compared with coding of other frames. Thereby, target frames as still frames are specified, and at least one frame among the still frames is subjected to high image quality coding. Therefore, an increase in the amount of codes to be generated, which is caused by coding all still frames at high image quality as in the conventional method, can be suppressed, and the image quality of subsequent frames can also be improved.

According to a second aspect of the present invention, in the image coding method according to the first aspect, the still frame judgement step performs the judgement on the basis of the difference value between the target frame and the reference frame. Thereby, a frame next to a frame which starts to come into a standstill is specified, and this next frame can be subjected to high image quality coding. As a result, the image quality of subsequent frames can also be improved.

According to a third aspect of the present invention, in the image coding method according to the first aspect, the high image quality coding step includes: a still frame coding judgement step of judging whether the target frame which is judged as a still frame should be subjected to still frame coding or normal frame coding; a quantization parameter value control step of controlling a quantization scale of an externally inputted quantization parameter, on the basis of the coding method determined in the still frame coding judgement step; a skip macroblock judgement step of judging whether each macroblock in the target frame is a skip macroblock or not, using the quantization parameter controlled in the quantization parameter value control step, and the difference value; and a coding step of coding the target frame on the basis of the results of judgements performed on the respective macroblocks in the target frame, which are obtained in the skip macroblock judgement step. Thereby, the number of macroblocks to be judged as skip macroblocks can be reduced. As a result, an increase in the amount of codes to be generated can be avoided, and a target frame judged as a still frame can be coded without degrading the image quality.

According to a fourth aspect of the present invention, in the image coding method according to the first aspect, the high image quality coding step includes: a still frame coding judgement step of judging whether the target frame which is judged as a still frame should be subjected to still frame coding or normal frame coding; a skip macroblock judgement step of judging whether each macroblock in the target frame is a skip macroblock or not, by using the difference value between the target frame and the reference frame, and a prescribed threshold value, when the target frame is judged as a frame not to be subjected to still frame coding, in the still frame coding judgement step, and controlling the prescribed threshold value to reduce it, and judging whether each macroblock in the target frame is a skip macroblock or not, using the controlled threshold value, and the difference value between the target frame and the reference frame, when the target frame is judged as a frame to be subjected to still frame coding, in the still frame coding judgement step; and a coding step of coding the target frame on the basis of the results of judgements performed on the respective macroblocks in the target frame, which are obtained in the skip macroblock judgement step. Thereby, the number of macroblocks to be judged as skip macroblocks can be reduced. As a result, an increase in the amount of codes to be generated can be avoided, and a target frame judged as a still frame can be coded without degrading the image quality.

According to a fifth aspect of the present invention, the image coding method according to the first aspect further includes: a still frame coding judgement step of judging whether a frame next to the target frame is a frame to be subjected to still frame coding or a frame to be subjected to normal frame coding, on the basis of coding information of the target frame that is determined in coding a frame previous to the target frame; a quantization parameter value control step of controlling a quantization scale of an externally inputted quantization parameter, on the basis of the coding method determined in the still frame judgement step; a skip macroblock judgement step of judging whether each macroblock in the target frame is a skip macroblock or not, by using the quantization parameter controlled in the quantization parameter value control step, and the difference value; and a coding step of determining a coding method for the next frame on the basis of the result of judgement performed in the still frame coding judgement step, and coding the target frame on the basis of coding information that is determined in coding the previous frame. Therefore, high image quality coding with less quantization errors can be carried out.

According to a sixth aspect of the present invention, in the image coding method according to the first aspect, the still frame judgement step is carried out on the basis of a coding type which is possessed by each macroblock in the reference frame and indicates a coding method for the macroblock. Thereby, the amount of arithmetic in judging as to whether a target frame is a still frame or not can be reduced. Further, a frame two frames after a frame which starts to come into a standstill is specified, and only this frame is coded at high image quality, whereby the amount of codes to be generated can be reduced as compared with the conventional method, and moreover, the image quality of subsequent frames can also be improved.

According to a seventh aspect of the present invention, in the image coding method according to the sixth aspect, the coding type of each macroblock is indicated by three values of flags comprising a first flag indicating whether the target macroblock is a skip macroblock or not, and a second and a third flags indicating, when the target macroblock is a skip macroblock, whether the target frame should be subjected to still frame according to the flag value of a macroblock which is referred to by the target macroblock. Thereby, a macroblock which has once been subjected to high image quality coding is judged as a skip macroblock without being subjected to high image quality coding in the subsequent processing. As a result, only the first frame can be coded with high image quality, and further, the amount of arithmetic in judging whether a target frame is a still frame or not can be reduced.

According to an eighth aspect of the present invention, in the image coding method according to the first aspect, the high image quality coding step does not perform high image quality coding on an I frame to be subjected to only intra-frame predictive coding. Thereby, a frame to be subjected to intra-frame predictive coding is not subjected to still frame coding. As a result, it becomes unnecessary to reduce the quantization scale, whereby an increase in the amount of codes to be generated can be further reduced.

According to a ninth aspect of the present invention, in the image coding method according to the first aspect, the high image quality coding step does not perform high image quality coding on a macroblock to be subjected to intra-frame predictive coding. Thereby, a frame to be subjected to intra-frame predictive coding is not subjected to still frame coding. As a result, it becomes unnecessary to reduce the quantization scale, whereby an increase in the amount of codes to be generated can be further reduced.

According to a tenth aspect of the present invention, there is provided an image coding method for dividing a target frame to be coded into macroblocks as processing units obtaining a difference value between the target frame and a reference frame, and coding the difference value, which method includes: a still macroblock judgement step of performing intra-frame prediction as to whether each macroblock in the target frame is standing still or not; and a macroblock coding step of coding a macroblock which is judged as a still macroblock in the still macroblock judgement step, with a higher image quality as compared with coding of other macroblocks. Thereby, the amount of codes to be generated can be reduced, and a target frame can be coded with high image quality.

According to an eleventh aspect of the present invention, in the image coding method according to the first aspect, the high image quality coding step includes: a still macroblock judgement step of judging whether each macroblock is standing still or not in the target frame which is judged as a still frame; and a macroblock coding step of coding a macroblock which is judged as a still macroblock in the still macroblock judgement step, with a higher image quality as compared with coding of other macroblocks. Therefore, high image quality coding with less coding errors due to variations in the quantization parameter can be carried out also in a frame to be subjected to still frame coding.

According to a twelfth aspect of the present invention, there is provided an image coding apparatus for dividing a target frame to be coded into macroblocks as processing units, obtaining a difference value between the target frame and a reference frame, and coding the target frame on the basis of the difference value, which apparatus includes: a still frame coding judgement unit for judging whether the target frame is a still frame or not on the basis of the difference value, and judging whether the target frame which is judged as a still frame is a frame to be subjected to still frame coding for coding the target frame with a higher image quality as compared with coding of other frames, or a frame to be subjected to normal frame coding; a quantization parameter value control unit for controlling a quantization scale of an externally inputted quantization parameter, on the basis of an output signal from the still frame coding judgement unit; a skip macroblock judgement unit for judging whether each macroblock in the target frame is a skip macroblock or not, using the quantization parameter controlled by the quantization parameter value control unit, and the difference value; and a coding unit for coding the target frame on the basis of an output from the skip macroblock judgement unit. Thereby, the number of macroblocks to be judged as skip macroblocks can be reduced, and a frame next to a frame which starts to come into a standstill can be coded with high image quality. As a result, the amount of codes to be generated can be reduced as compared with the conventional method, and moreover, the image quality of subsequent frames can also be improved.

According to a thirteenth aspect of the present invention, in the image coding apparatus according to the twelfth aspect, the coding unit performs the coding by using the quantization parameter that is controlled by the quantization parameter value control unit. Thereby, high image quality coding with less quantization error can be carried out.

According to a fourteenth aspect of the present invention, there is provided an image coding apparatus for dividing a target frame to be coded into macroblocks as processing units, obtaining a difference value between the target frame and an already-coded reference frame, and coding the target frame on the basis of the difference value, which apparatus includes: a still frame coding judgement unit for judging whether the target frame is a still frame or not on the basis of the difference value, and judging whether the target frame that is judged as a still frame is a frame to be subjected to still frame coding for coding the target frame with a higher image quality as compared with coding of other frames, or a frame to be subjected to normal frame coding; a skip macroblock judgement unit for judging whether each macroblock in the target frame is a skip macroblock or not, using an output from the still frame coding judgement unit and the difference value; and a coding unit for coding the target frame on the basis of an output from the skip macroblock judgement unit. Thereby, the number of macroblocks to be judged as skip macroblocks can be reduced, and a frame next to a frame which starts to come into a standstill can be coded with high image quality. As a result, the amount of codes to be generated can be reduced as compared with the conventional method, and moreover, the image quality of subsequent frames can also be improved.

According to a fifteenth aspect of the present invention, the image coding apparatus according to the fourteenth aspect further includes: a quantization parameter value control unit for controlling a quantization scale of an externally inputted quantization parameter, on the basis of an output signal from the still frame coding judgement unit; and the coding unit coding the target frame by using the quantization parameter that is controlled by the quantization parameter value control unit. Thereby, high image quality coding with less quantization error can be carried out.

According to a sixteenth aspect of the present invention, there is provided an image coding apparatus for dividing a target frame to be coded into macroblocks as processing units, obtaining a difference value between the target frame and a reference frame, and coding the target frame on the basis of the difference value, which apparatus includes: a skip macroblock judgement unit for performing intra-frame prediction as to whether each macroblock in the target frame is standing still or not, and judging that a target macroblock is a still macroblock when macroblocks in the vicinity of the target macroblock are skip macroblocks; a quantization parameter value control unit for controlling a quantization parameter value of the target macroblock which is judged as a still macroblock by the skip macroblock judgement unit so that the quantization parameter value becomes smaller than an externally inputted quantization parameter value; and a coding unit for coding the macroblock which is judged as a still macroblock, with a high image quantity as compared with coding of other macroblocks, by using the quantization parameter controlled by the quantization parameter value control unit. Thereby, the amount of codes to be generated can be reduced, and coding with high image quality can be carried out.

According to a seventeenth aspect of the present invention, there is provided an image coding apparatus for dividing a target frame to be coded into macroblocks as processing units, obtaining a difference value between the target frame and a reference frame, and coding the difference value, which apparatus includes: a still frame coding judgement unit for judging whether a frame next to the target frame is a frame to be subjected to still frame coding for coding the target frame with a higher image quality as compared with coding of other frames, or a frame to be subjected to normal frame coding, on the basis of coding information of the target frame which is determined in coding a frame previous to the target frame; a quantization parameter value control unit for controlling a quantization scale of an externally inputted quantization parameter, on the basis of an output from the still frame judgement unit; a skip macroblock judgement unit for judging whether each macroblock in the target frame is a skip macroblock or not, using the difference value and the quantization parameter controlled by the quantization parameter value control unit; and a coding unit for determining a coding method of the frame next to the target frame on the basis of the result of judgement by the still frame coding judgment unit, and coding the target frame on the basis of coding information which is determined in coding the previous frame. Thereby, the number of macroblocks to be judged as skip macroblocks can be reduced, and a frame next to a frame which starts to come into a standstill can be coded with high image quality. As a result, the amount of codes to be generated can be reduced as compared with the conventional method, and moreover, the image quality of subsequent frames can also be improved.

According to an eighteenth aspect of the present invention, in the image coding apparatus according to the seventeenth aspect, the coding unit performs the coding by using the quantization parameter that is controlled by the quantization parameter value control unit. Thereby, high image quality coding with less quantization error can be carried out.

According to a nineteenth aspect of the present invention, in the image coding apparatus according to the seventeenth aspect, the skip macroblock judgement unit starts the skip macroblock judgement process on receipt of a frame coding signal indicating a coding method of the target frame, which signal is supplied from the outside; and the coding unit performs coding of each macroblock in the target frame when the frame coding signal is a signal indicating intra-frame predictive coding, and performs coding of the difference value when the frame coding signal is not a signal indicating intra-frame predictive coding. Thereby, still frame coding is not performed on a frame and a macroblock to be subjected to intra-frame predictive coding. As a result, there is no necessity to reduce the quantization scale, and an increase in the amount of codes to be generated can be further suppressed.

According to a twentieth aspect of the present invention, there is provided an image coding apparatus for dividing a target frame to be coded into macroblocks as processing units, obtaining a difference value between the target frame and a reference frame, and coding the difference value, which apparatus includes: a skip macroblock judgement unit for judging whether each macroblock in the target frame is a skip macroblock or not, by using the difference value and an externally inputted quantization parameter; a still frame coding judgement unit for judging whether a frame next to the target frame is a frame to be subjected to still frame coding for coding the target frame with a higher image quality as compared with coding of other frames, or a frame to be subjected to normal frame coding, on the basis of coding information of the target frame which is determined in coding a frame previous to the target frame; and a coding unit for determining a coding method of the frame next to the target frame on the basis of the result of judgement by the still frame coding judgement unit, and performing coding of the target frame on the basis of the coding information which is determined in coding the previous frame. Thereby, a process of judging whether a next frame should be subjected to still frame coding or not can be easily realized. Further, the number of macroblocks to be judged as skip macroblocks can be reduced, and a frame which is two frames after a frame that starts to come into a standstill can be coded with high image quality. As a result, the number of codes to be generated can be reduced as compared with the conventional apparatus, and the image quality of subsequent frames can also be improved.

According to a twenty-first aspect of the present invention, the image coding apparatus according to the twentieth aspect further includes: a quantization parameter value control unit for controlling a quantization scale of an externally inputted quantization parameter, on the basis of an output from the still frame coding judgment unit; and the coding unit performing the coding by using the quantization parameter that is controlled by the quantization parameter value control unit. Thereby, high image quality coding with less quantization error can be carried out.

According to a twenty-second aspect of the present invention, in the image coding apparatus according to the twentieth aspect, the skip macroblock judgement unit starts the skip macroblock judgement process on receipt of a frame coding signal indicating a coding method of the target frame, which signal is supplied from the outside; and the coding unit performs coding of each macroblock in the target frame when the frame coding signal indicates intra-frame predictive coding, and performs coding of the difference value when the frame coding signal is not a signal indicating intra-frame predictive coding. Thereby, still frame coding is not performed on a frame and a macroblock to be subjected to intra-frame predictive coding. As a result, it becomes unnecessary to reduce the quantization scale, and an increase in the amount of codes to be generated can be further suppressed.

According to a twenty-third aspect of the present invention, there is provided a program for making a computer execute a process of dividing a target frame to be coded into macroblocks as processing units, obtaining a difference value between the target frame and a reference frame, and coding the difference frame, which program makes the computer execute a high image quality coding process comprising: judging whether the target frame to be coded is a still frame or not; and coding at least one frame among plural frames which are judged as still frames as the results of judgement, with a higher image quality as compared with coding of other frames. Thereby, target frames as still frames are specified, and at least one frame among the still frames can be subjected to high image quality coding. Therefore, an increase in the amount of codes to be generated, which is caused by coding all still frames at high image quality as in the conventional method, can be suppressed, and moreover, the image quality of subsequent frames can also be improved.

DETAILED DESCRIPTION OF THE PREFERRED EMBODIMENTS

Hereinafter, preferred embodiments of the present invention will be described with reference to the drawings. However, the embodiments described hereinafter are merely examples, and the present invention is not restricted thereto.

Embodiment 1

Hereinafter, an image coding apparatus and an image coding method according to a first embodiment of the present invention will be described.

An image coding apparatus 100 according to the first embodiment performs one-pass coding in which a target image signal is coded only once, and the apparatus 100 judges whether a frame to be coded is a still frame or not, and subjects a frame next to (one frame after) a frame that starts to come into a standstill (a frame immediately previous to the frame judged as a still frame), to a coding process (still frame coding) which provides a higher image quality than those of other frames.

Figure 1:
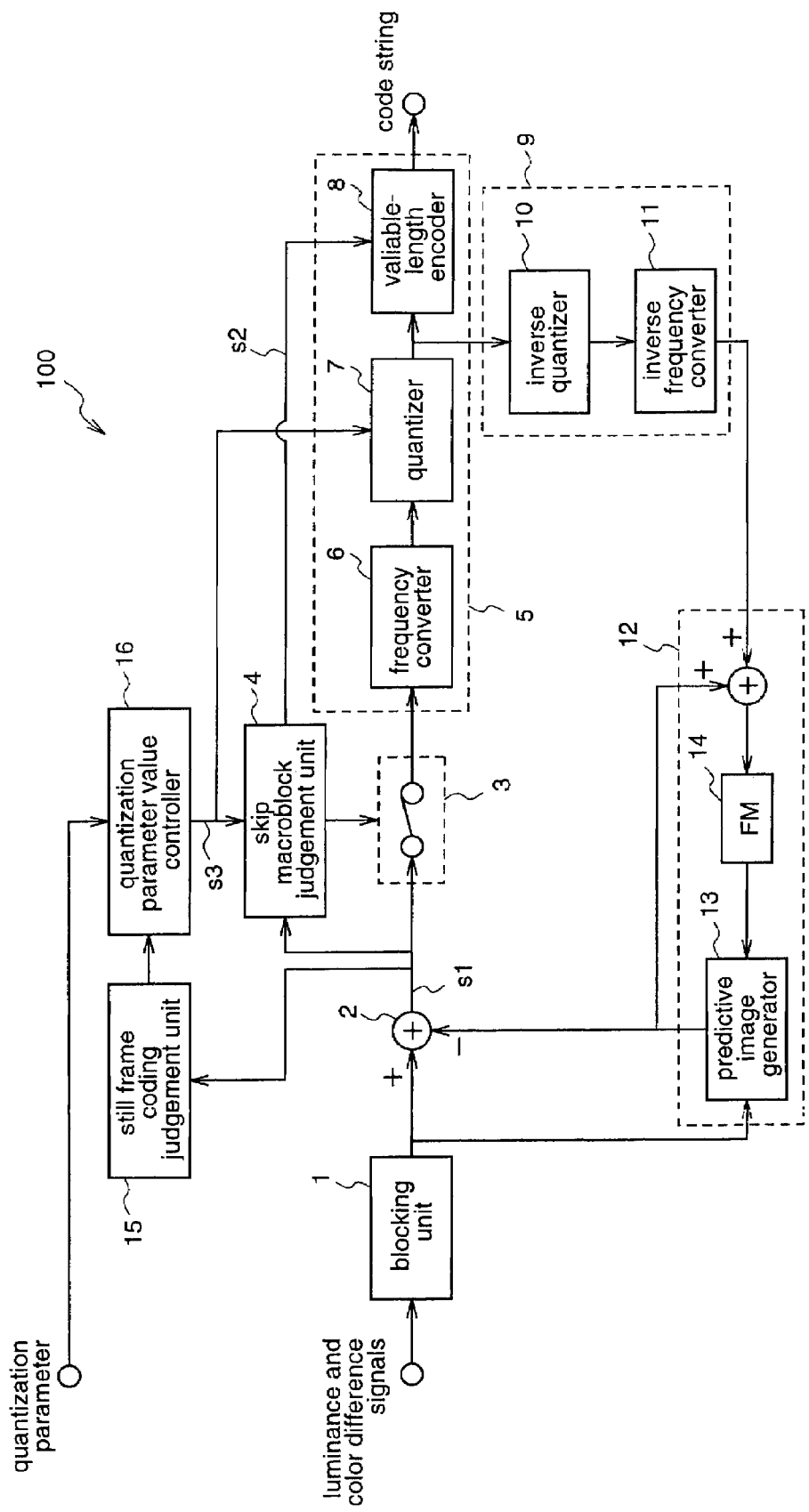
FIG. 1 is a block diagram illustrating the construction of an image coding apparatus according to a first embodiment of the present invention.
Figure 16:
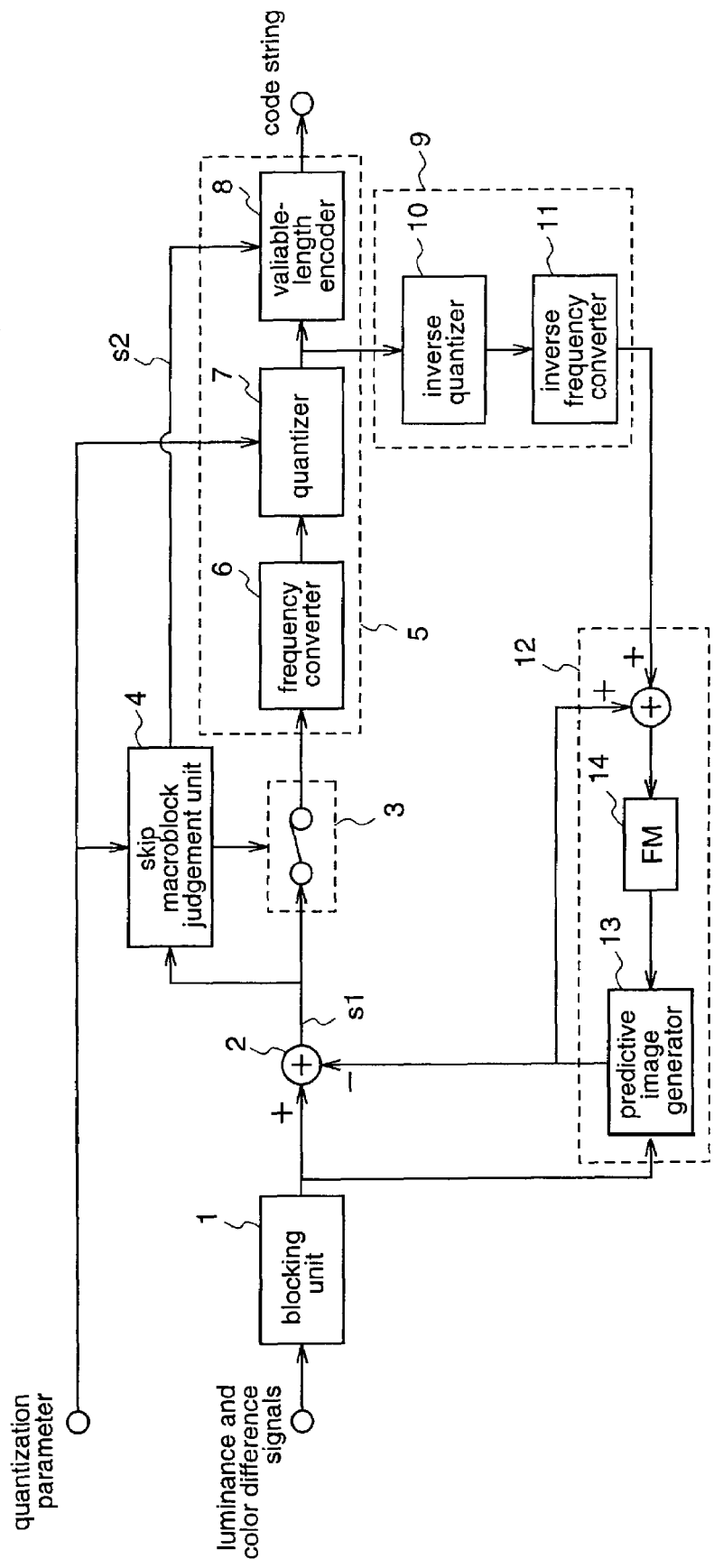
FIG. 16 is a block diagram for explaining a common image coding apparatus which is conventionally employed.

FIG. 1 is a block diagram illustrating the construction of the image coding apparatus 100 according to the first embodiment. Since, in FIG. 1, the same reference numerals as those shown in FIG. 16 denote the same or corresponding components, repeated description is not necessary.

In FIG. 1, reference numeral 15 denotes a still frame coding judgement unit for judging whether a target frame is a frame to be subjected to still frame coding or a frame to be subjected to normal coding (conventional coding). Reference numeral 16 denotes a quantization parameter value controller for controlling a quantization scale of an externally supplied quantization parameter on the basis of the output from the still frame coding judgement unit 15.

Hereinafter, the operation of the image coding apparatus 100 constituted as described above will be described.

Initially, luminance and color-difference signals of a frame to be coded are divided into macroblocks as processing units by the blocking unit 1, and a difference value s1 between the target frame and a reference frame is obtained by the subtracter 2. Then, it is judged whether the target frame is a still frame (i.e., a frame that is completely standing still or a frame having more still portions as compared with an immediately previous frame) or not, and further, it is judged whether a frame judged as a still frame should be subjected to still frame coding or normal frame coding, by the still frame coding judgement unit 15. The quantization scale of the externally supplied quantization parameter is controlled by the quantization parameter value controller 16 on the basis of the judgement result (the output of the still frame coding judgement unit 15), and the controlled quantization parameter s3 (the output of the quantization parameter value controller 16) is input to the skip macroblock judgement unit 4.

The skip macroblock judgement unit 4 judges whether the target macroblock is a skip macroblock or not, using the difference value s1 and the quantization parameter s3.

When the skip macroblock judgement unit 4 judges that the target macroblock is not a skip macroblock, the switch 3 is turned on to output the difference value s1 to the compressive coding unit 5, and the difference value s1 is converted into a frequency domain signal by the frequency converter 6 in the compressive coding unit 5. Then, the frequency domain signal is quantized by the quantizer 7 using the quantization parameter s3 that is output from the quantization parameter value controller 16, and further, the output of the quantizer 7 (quantization factor) is variable-length coded by the variable length encoder 8. The output of the quantizer 7 is locally decoded by the local decoding unit 9, and the locally decoded data is used for generation of a predictive image (predictive macroblock) in the local predictive image generation unit 12.

On the other hand, when the target macroblock is judged as a skip macroblock by the skip macroblock judgement unit 4, a skip macroblock signal s2 is output from the skip macroblock judgement unit 4 to the variable length encoder 8. In the variable length encoder 8, the skip macroblock signal s2 is multiplexed with data that is obtained by variable-length coding a difference signal of another macroblock, and the result is output as a code string.

Hereinafter, the operation of the still frame coding judgement unit 15 will be described.

Initially, a still frame judgement method employed by the still frame coding judgement unit 15 will be described in detail with reference to FIG. 2.

Figure 2:
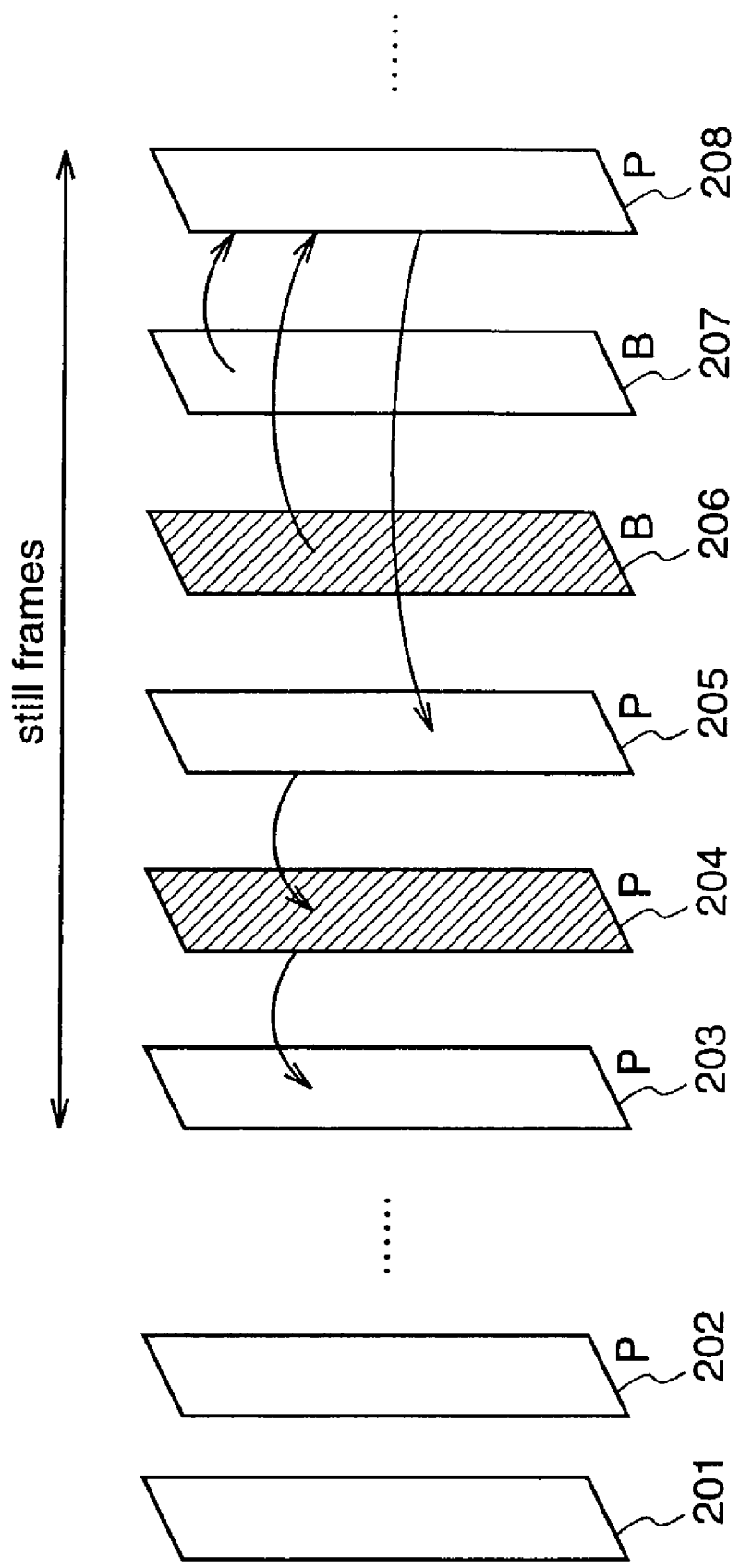
FIG. 2 is a conceptual diagram illustrating frames which are judged as still frames, according to the first embodiment and a second embodiment of the present invention.

FIG. 2 shows frames 201~208 of an image to be coded, and these frames are successively coded starting from the frame 201. It is assumed that the frames 203~208 are still frames to be subjected to inter-frame predictive coding, the frames 203~205 and 208 are frames (P frames) to be subjected to forward predictive coding (predictive coding with reference to a past frame), and the frames 206 and 207 are frames (B frames) to be subjected to bidirectional predictive coding (predictive coding with reference to both or either of a past frame and a future frame). Each frame has a reference frame indicated by an arrow, for example, the frame 204 refers to the frame 203.

When coding each macroblock in the frame 204 as a P frame, the still frame coding judgement unit 15 employs the frame 203 as a reference frame, and codes a difference value between the target macroblock and the corresponding macroblock in the reference frame 203. At this time, when the mean absolute value of the difference value of the target frame is small, the target frame is judged as a still frame. Likewise, the frame 204 is referred to in coding the frame 205, the frame 205 is referred to in coding the frame 208, and the frame 208 is referred to in coding the frames 206 and 207 as B frames, and thus a difference value between corresponding macroblocks in the target frame and the reference frame is coded.

In this way, the still frame coding judgement unit 15 judges the target frame as a still frame when the mean absolute value of the difference value between the target frame and the reference frame is smaller than a predetermined threshold value. Accordingly, a frame (target frame) to be judged as a still frame is a frame that is at least one frame after a frame at which the image has come into a standstill. In FIG. 2, the frame 204 is the first still frame, and the frames 205~208 over which the image standstill continues are subsequent still frames.

Figure 3:
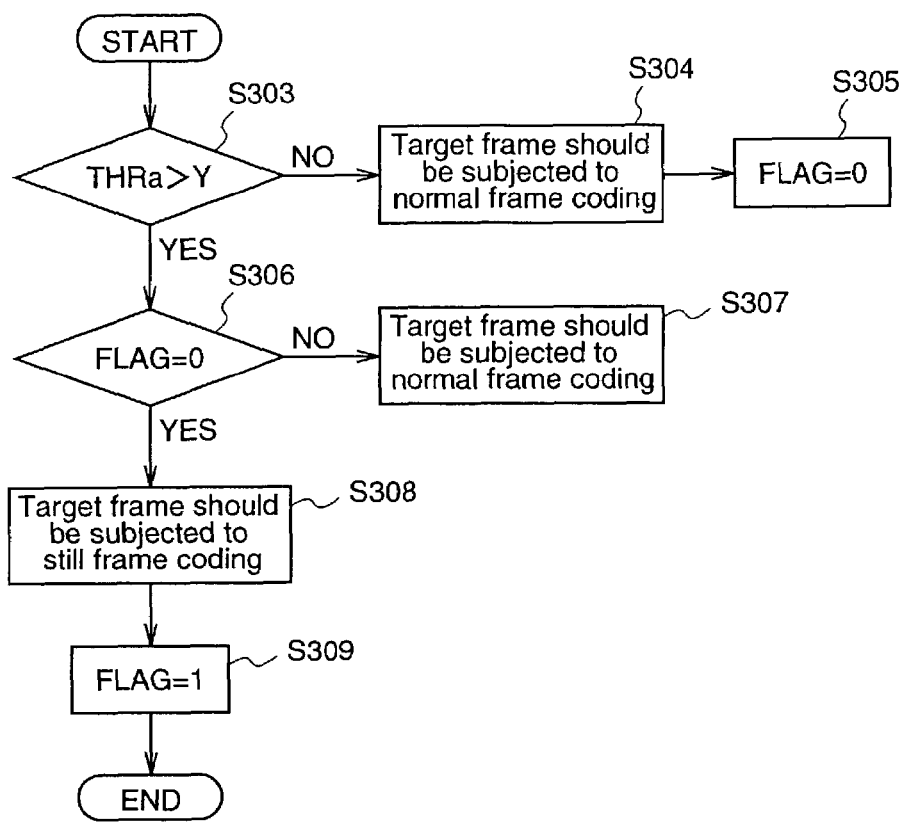
FIG. 3 is a flowchart illustrating a process of judging as to whether still frame coding should be carried out or not, by the image coding apparatus according to the first embodiment.

Next, a description will be given of a coding judgement method for judging whether the frame that is judged as a still frame in the above-described still frame judgement process should be subjected to still frame coding or normal frame coding, with reference to FIG. 3. While in this first embodiment 0 and 1 are employed as values of FLAG that is used for determining the frame coding method, the values of FLAG are not restricted thereto.

Initially, the still frame coding judgement unit 15 judges whether or not the mean absolute value Y of the inter-frame difference between the target frame and the reference frame is smaller than a threshold value THRa that is determined by a prescribed method (step S303).

When it is judged in step S303 that the mean absolute value Y of the inter-frame difference is larger than the threshold value THRa, the target frame is judged as a frame to be subjected to normal inter-frame predictive coding (step S304), and the FLAG for determining the frame coding method is updated to 0 (step S305).

On the other hand, when the mean absolute value Y of the inter-frame difference is smaller than the threshold value THRa in step S303, it is judged whether the FLAG is 0 or not (step S306). When the FLAG is not 0, the target frame is judged as a frame to be subjected to normal inter-frame predictive coding (step S307). When the FLAG is 0, the target frame is judged as a frame to be subjected to still frame coding (step S308), and the FLAG is updated to 1 (step S309).

The FLAG has an initial value of 0, and it is updated to 1 at the timing when the target frame is subjected to still frame coding, and this value is not updated while the image is standing still (while still frames continue). The FLAG is updated to 0 at the timing when the target frame is judged as not a still frame, and this value is not updated until a next still frame.

In this way, whether the target frame should be coded as a still frame or not is judged according to the value of FLAG, and a frame one frame after a frame at which the image starts to come into a standstill is specified, and only the specified frame is subjected to still frame coding.

Figure 4:
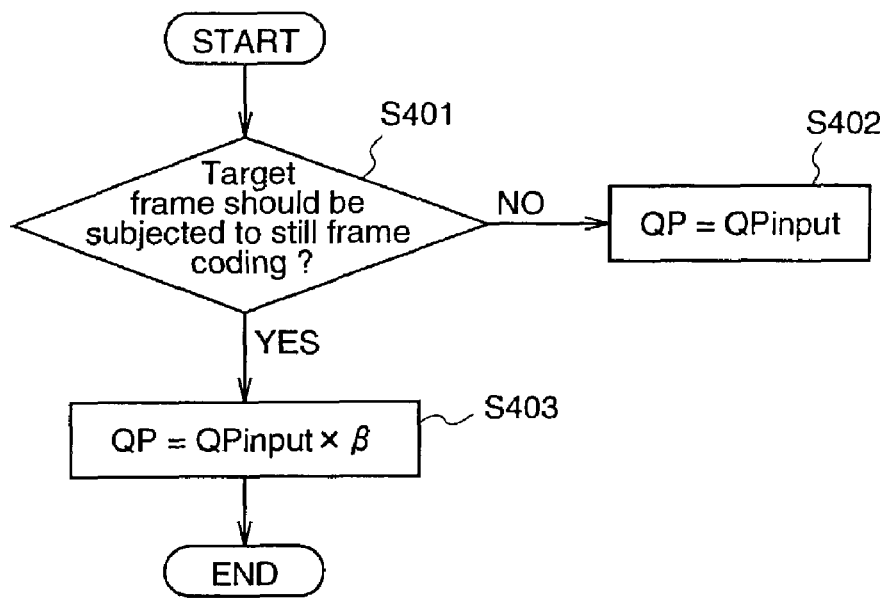
FIG. 4 is a flowchart illustrating a process of controlling a quantization parameter value by the image coding apparatus according to the first embodiment.

Next, the quantization parameter value controller 16 for controlling the quantization parameter value according to the output of the still frame coding judgement unit 15, will be described in detail with reference to FIG. 4.

When the quantization parameter value controller 16 receives the output of the still frame coding judgement unit 15 (the signal indicating the result of judgement as to whether the target frame should be subjected to still frame coding or not) and the externally supplied quantization parameter, the controller 16 starts to control the quantization parameter value, and judges whether the target frame should be subjected to still frame coding or not, on the basis of the output signal from the still frame coding judgement unit 15 (step S401).

When it is judged in step S401 that the target frame should not be subjected to still frame coding, the externally supplied quantization parameter value QP input is used as the quantization parameter value QP of the target frame (step S402).

On the other hand, when it is judged in step S401 that the target frame should be subjected to still frame coding, the quantization parameter value QP for the target frame is obtained by multiplying the externally supplied quantization parameter value QPinput with a value $\beta(0<\beta<1)$ that is determined by a prescribed method (step S403).

Figure 17:
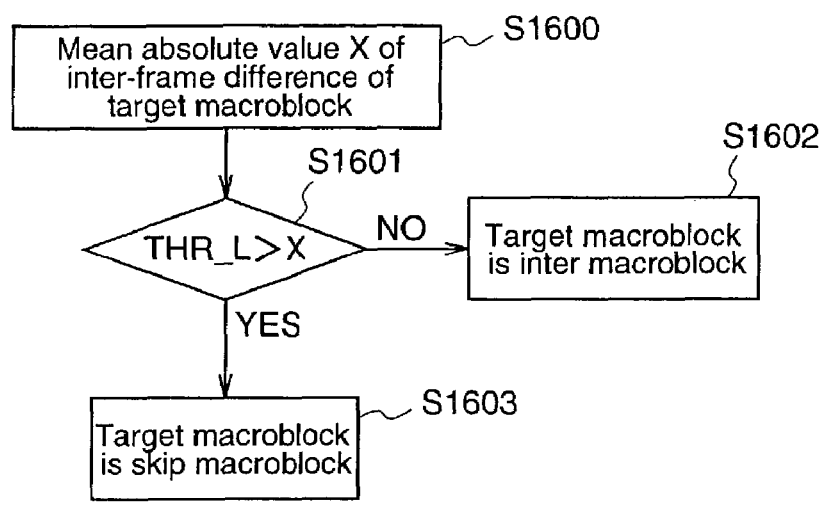
FIG. 17 is a flowchart illustrating a process of determining a skip macroblock by the conventional image coding apparatus.

As described above, when the still frame coding judgement unit 15 judges that the target frame is a frame to be subjected to still frame coding (a frame one frame after a frame at which the image starts to come into a standstill), a quantization parameter value smaller than the usual quantization parameter value is employed (i.e., the quantization scale is reduced). Thereby, in the skip macroblock judgement unit 4, the threshold value THR_L in step 1601, which is shown in FIG. 17 with respect to the conventional image coding method, consequently becomes a small value, and the rate of skip macroblocks is reduced as compared with the case where the target frame is not subjected to still frame coding. This reduction in the rate of skip macroblocks is equivalent to an increase in portions (inter-macroblocks) which are not replaced with reference macroblocks but are coded with respect to their difference values, and therefore, it is effective for coding, with high image quality, a frame one frame after a frame at which the image starts to come into a standstill. Further, when a still frame to be subjected to still frame coding is subjected to quantization by the quantizer 7 using a quantization parameter that is set at a value smaller than that for normal frame coding, coding with less quantization error, i.e., high image quality coding, can be carried out.

The quantization parameter to be used by the quantizer 7 is not restricted to the output s3 of the quantization parameter value controller 16, and the externally supplied quantization parameter may be used.

Further, while in the above-described image coding apparatus 100 the quantization parameter s3 outputted from the quantization parameter value controller 16 is input to the skip macroblock judgement unit 4, the output of the still frame coding judgement unit 15 may be input to the skip macroblock judgement unit 4.

Hereinafter, a description will be given of an image coding apparatus in the case where the output of the still frame coding judgement unit 15 is input to the skip macroblock judgement unit 4. Although the skip macroblock judgement unit 4 employed in the image coding apparatus 100 shown in FIG. 1 or in the conventional image coding apparatus 1500 performs the judgement as to whether the target macroblock is a skip macroblock or not by using the threshold value THR_L determined from the quantization parameter value, the skip macroblock judgement unit 4 employed in the image coding apparatus 110 shown in FIG. 5 performs the judgement using the output of the still frame coding judgement unit 15.

Initially, the operation of the skip macroblock judgement unit 4 of the image coding apparatus 110 shown in FIG. 5 will be described with reference to FIG. 6.

On receipt of the output from the still frame coding judgement unit 15 (a signal indicating whether the target frame should be subjected to still frame coding or not), the skip macroblock judgement unit 4 starts judgement for skip macroblocks, and judges whether the target frame is a frame to be subjected to still frame coding or not, on the basis of the input signal (step S601).

When the result of judgement indicates that the target frame is not a frame to be subjected to still frame coding, the threshold value THRskip is set to a threshold value THRskip_base that is determined by a prescribed method (step S602). On the other hand, when the target frame is judged as a frame to be subjected to still frame coding, the threshold value THRskip is set to a value obtained by multiplying the threshold value THRskip_base with a value $\gamma(0<\gamma<1)$ that is determined by a prescribed method (step S603). The threshold value THRskip is used for judgement as to whether the target macroblock is a skip macroblock or not.

Next, using the threshold value THRship that is determined in step S602 or step S603, it is judged whether the mean absolute value X of the inter-frame difference value s1 of the target macroblock, which is supplied from the subtracter 2, is smaller than the threshold value THRskip or not (step 604). When the result of judgement indicates that the mean absolute value X of the difference value of the target macroblock is equal to or larger than the threshold value THRskip, this macroblock is judged as a macroblock to be subjected to coding of its inter-frame difference value (step S605), and otherwise, the target macroblock is judged as a skip macroblock (step S606).

As described above, when the target frame is subjected to still frame coding, the threshold value THRskip used for the judgement in the skip macroblock judgement unit 4 can be a smaller value than that used in the case where the target frame is not subjected to still frame coding, whereby portions to be judged as skip macroblocks in the target frame are reduced. This reduction is equivalent to an increase in portions (macroblocks) which are not replaced with the reference macroblock but are subjected to coding of their difference values, and it is effective in coding a frame to be subjected to still frame coding, with high image quality.

Figure 5:
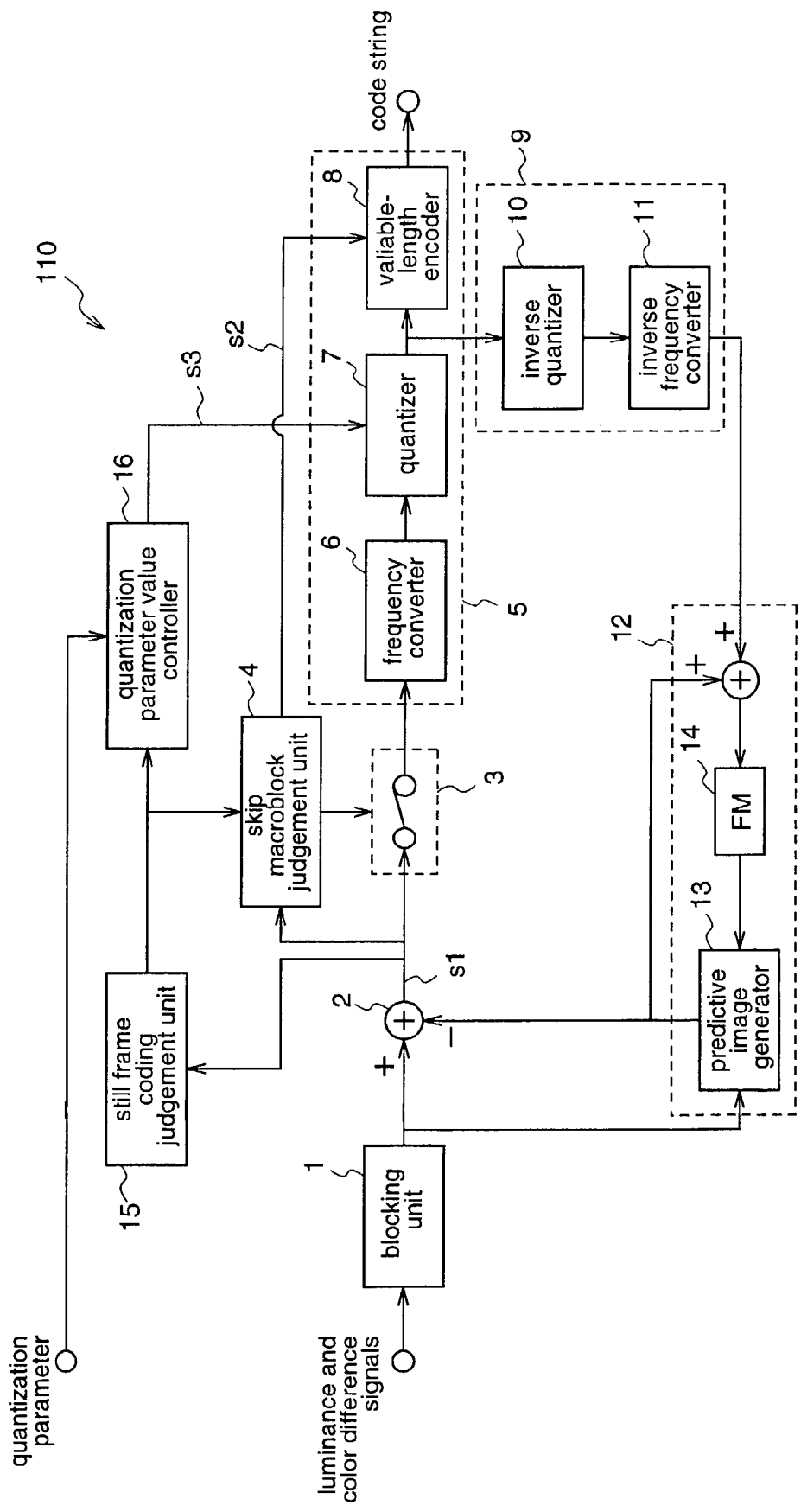
FIG. 5 is a block diagram illustrating a modification of the image coding apparatus according to the first embodiment, in the case where an input to a skip macroblock judgement unit is an output from a still frame coding judgement unit.
Figure 6:
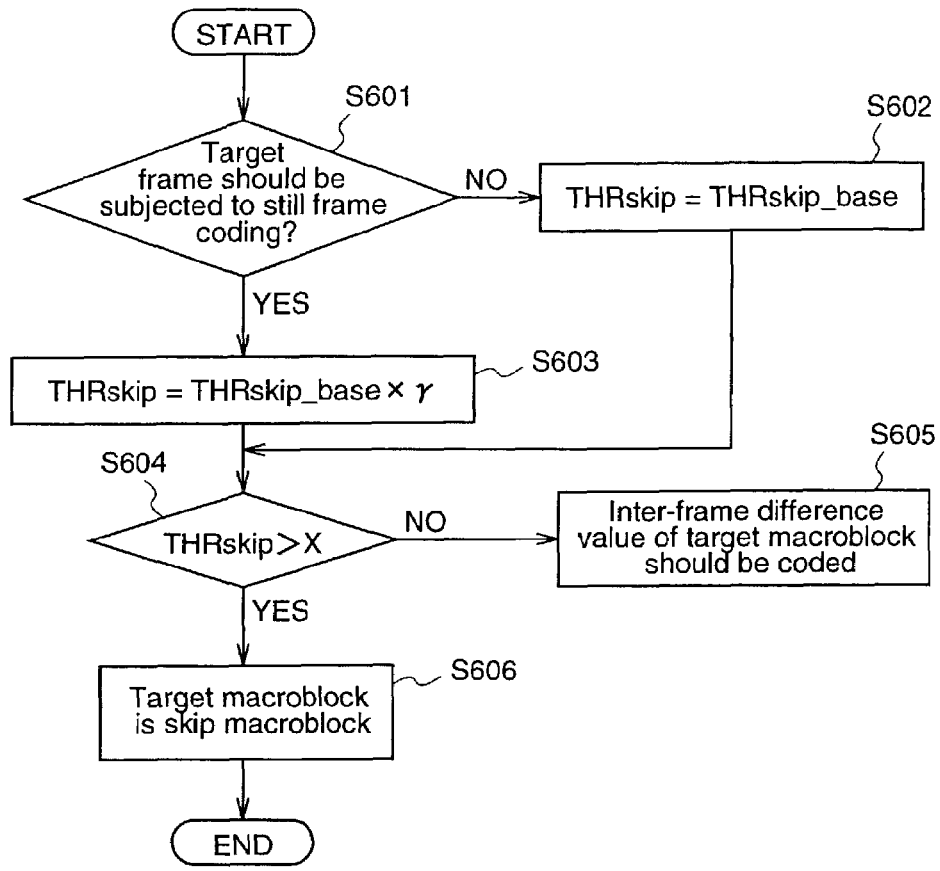
FIG. 6 is a flowchart illustrating a process of determining a skip macroblock by the image coding apparatus, in the case where an input to the skip macroblock judgement unit is an output from the still frame coding judgement unit.

In the image coding apparatus 110 shown in FIG. 5, the quantization parameter value controller 16 may be removed, and the quantization parameter to be used for quantization in the quantizer 7 may be the externally inputted quantization parameter.

In the image coding apparatus according to the first embodiment, a frame which is one frame after a frame at which an image to be coded by one-pass coding starts to come into a standstill, is subjected to coding with higher image quality, as compared with other frames. Therefore, the following still frames can refer to the image that is coded with high image quality. Further, the image quality of frames in a period during which the image is standing still can be improved with a shorter coding time, as compared with two-pass coding in which coding is carried out with reference to once-coded data.

In this first embodiment, with respect to coding of a frame which is judged as a subsequent still frame in the still frame coding judgement unit 15, the quantization parameter value to be used for this coding may be controlled to be larger than the externally inputted quantization parameter value by the quantization parameter value controller 16. In this case, although the skip macroblocks in the target frame are increased as compared with those in other frames, since the reference macroblocks to be used instead of the skip macroblocks have already been coded with high image quality, degradation in image quality hardly occurs, and further, the amount of codes to be generated can be reduced as compared with other frames.

Further, in this first embodiment, an inter-frame difference between a target frame and a reference frame is obtained to determine a coding method for the target frame (whether the target frame should be subjected to still frame coding or not), immediately before coding of the target frame is started. However, the difference values which are calculated in coding the respective macroblocks in the target frame may be stored, and a difference value of the whole frame may be obtained from the stored difference values to determine a coding method for a next target frame from the obtained difference value, after coding of the target frame is completed.

Furthermore, while in this first embodiment one-pass coding is employed, two-pass coding in which coding is carried out with reference to once-coded data may be employed. In this case, judgement as to whether a target frame is a still frame or not is carried out on the basis of the amount of codes generated in each once-coded frame, or a flag which is given in the first-pass coding and indicates a still frame, or the difference value of the frame, and then coding with high image quality (still frame coding) is performed on the frame which starts to come into a standstill (hereinafter referred to as a standstill starting frame), whereby this frame can be accurately specified although the coding process takes a longer time as compared with the one-pass coding process. As a result, the frame to be subjected to still frame coding can be coded with high image quality, by one frame earlier than in the image coding apparatuses shown in FIGS. 1 and 5 according to the first embodiment.

The coded image data (bit stream) obtained by the image coding apparatus 100 (110) according to the first embodiment has the following characteristics.

Since a frame next to a frame which starts to come into a standstill (standstill starting frame) is surely coded with high image quality by the image coding apparatus 100 (110), the coded bit stream is characterized by that the quantization parameter value of the frame immediately after the standstill starting frame becomes smaller than those of other P frames, and a frame immediately after the frame having the small quantization parameter value has a high rate of skip macroblocks, as compared with the bit stream obtained by the conventional image coding apparatus. The reason is as follows. As the image quality of the frame which has been subjected to high image quality coding is higher, the difference value becomes smaller in coding the subsequent still frame, whereby the rate of skip macroblocks is increased. As a result, the image quality of the subsequent frame can be improved.

Furthermore, when the frame immediately after the standstill starting frame is coded as an I frame by the image coding apparatus 100 (110), the coded bit stream is characterized by that the frame immediately after the standstill starting frame is surely coded as an I frame. Since the image quality of an I frame is higher than that of a P frame, the image quality obtained by this coding method is improved as compared with that obtained by still frame coding.

Furthermore, when the quantization parameter value is controlled by the image coding apparatus 100 (110) such that it is reduced in the frame immediately after the standstill starting frame and, thereafter, increased to be larger than the normal value in the subsequent still frame, whereby the coded bit stream is characterized by that the quantization parameter value is large in the subsequent still frame of the still image. When the quantization parameter value of the subsequent still frame is increased, the number of skip macroblocks is increased, and an image subjected to still frame coding is displayed, whereby a high-quality image can be displayed. Further, the amount of codes generated per frame is increased when the frame immediately after the standstill starting frame is coded as a still frame with the quantization parameter value being reduced, but by contrast, the amount of codes generated per frame is reduced when the quantization parameter value is increased in the subsequent still frame. Therefore, the amount of generated codes is averaged between the still images, and the average amount of generated codes (bit rate) becomes approximately constant.

The bit stream having the above-described characteristics can be decoded by an image decoding apparatus which is commonly used, and further, an image of higher quality can be reproduced as compared with the bit stream obtained by the conventional image coding apparatus. Further, the image decoding apparatus may perform, not the conventional image decoding process described above, but an image decoding process as follows. That is, in decoding the subsequent still frame, when the number of skip macroblocks exceeds a number that is obtained with respect to the total number of macroblocks by a predetermined method, the image decoding apparatus judges this frame as a skip frame not to be displayed, and starts decoding of a next frame. Thereby, a high-quality image can be reproduced and, moreover, the amount of arithmetic in the decoding process can be reduced.

The image coding method according to the first embodiment can be incorporated into standardized image coding methods such as MPEG-2, MPEG-4, H.261, H.263, and the like. However, in MPEG-4 standard, it is defined that variations in a quantization parameter value of a macroblock should be within a range of ±2.

Further, while in this first embodiment judgement as to whether a target frame is a still frame or not is carried out between frames, intra-frame prediction may be employed as a method for judging whether an image is standing still or not, that is, it may be predicted from an already-coded macroblock which is close to a target macroblock in the same frame. For example, in the still image judgement method of the apparatus shown in FIG. 1 or 5, whether a target frame is a still frame or not is judged by using only a difference value between the target frame and a reference frame. However, whether each macroblock in the target frame is a still macroblock or not may be judged on the basis of information indicating whether already-coded neighboring macroblocks in the same frame (i.e., already-coded macroblocks which are located above, on the left side of, on the upper-left side of the target macroblock, etc.) are skip macroblocks or not. Further, variations in the quantization parameter value of each macroblock may be determined not only from the difference value and flag but also from the states of the already-coded neighboring macroblocks. For example, when a macroblock immediately before the target macroblock is a skip macroblock, the quantization parameter value of the target macroblock is reduced, whereby the target macroblock can be coded with high image quality.

Figure 7:
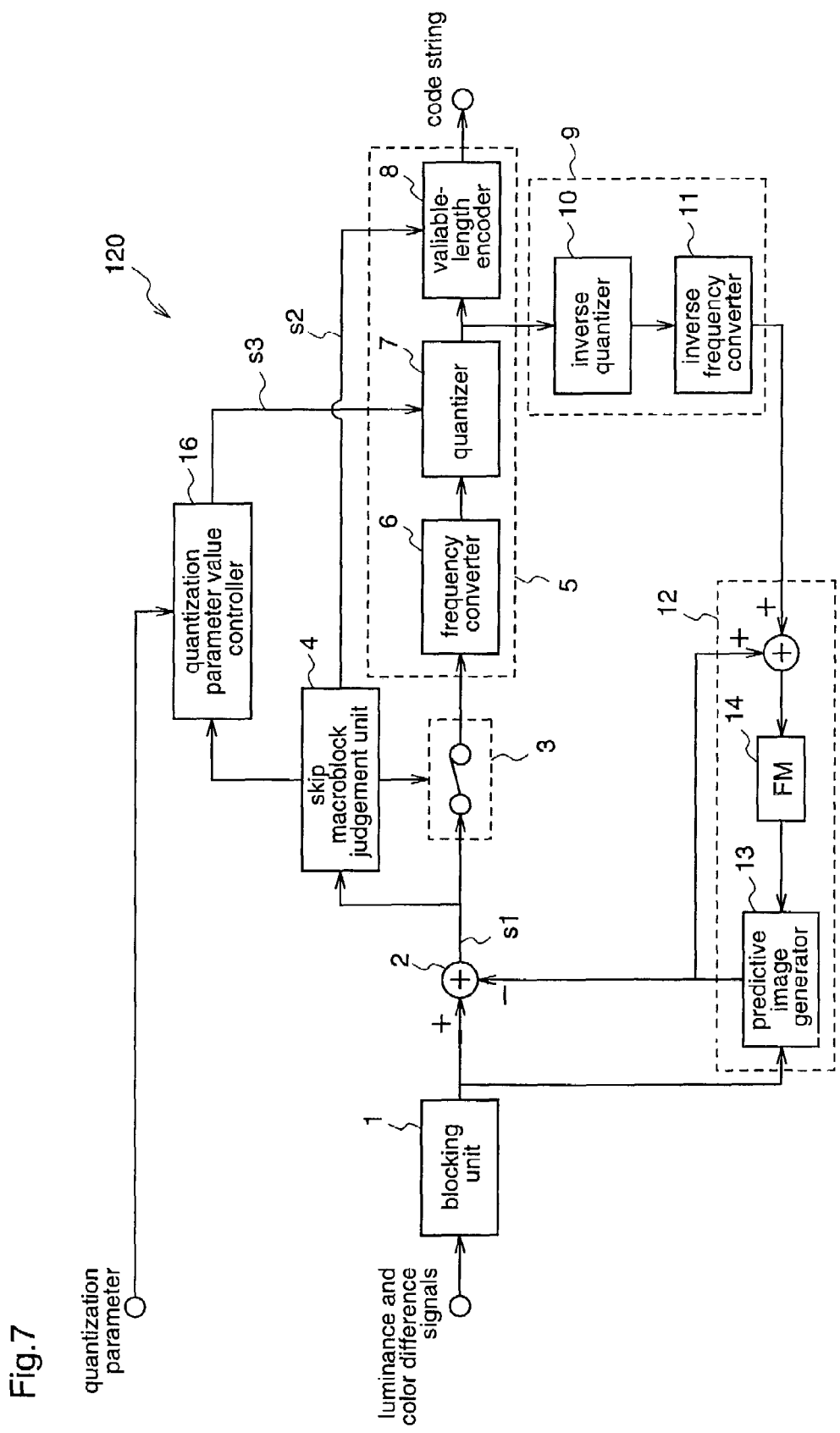
FIG. 7 is a block diagram illustrating a modification of the image coding apparatus according to the first embodiment, in the case where intra-frame prediction is employed.
Figure 8:
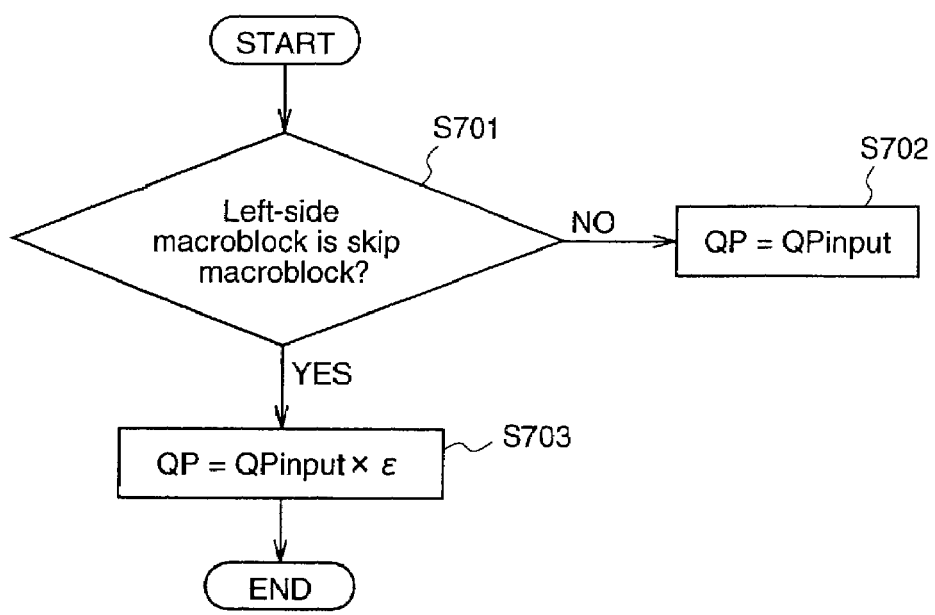
FIG. 8 is a flowchart illustrating a process of controlling a quantization parameter value by the image coding apparatus according to the first embodiment in the case where intra-frame prediction is employed.

FIG. 7 is a block diagram illustrating an example of an image coding apparatus in the case where the above-mentioned still image judgement method using intra-frame prediction is employed. In FIG. 7, the same reference numerals as those shown in FIG. 1 denote the same or corresponding components, and therefore, repeated description is not necessary.

Hereinafter, a skip macroblock judgement method of the image coding apparatus 120 shown in FIG. 7 will be described.

Initially, the skip macroblock judgement unit 4 judges whether a macroblock on the left side of a target macroblock is a skip macroblock or not (step S701). Although in this example the left-side macroblock is used as a reference macroblock, a reference macroblock is not restricted to the left-side macroblock (i.e., an immediately previous macroblock). Any macroblock located in the vicinity of the target block (e.g., macroblocks located above, on the left side of, on the upper-left corner of the target macroblock, etc.) may be used. The larger the number of neighboring reference macroblocks is, the higher the accuracy of skip macroblock judgement becomes.

When the left-side macroblock is not a skip macroblock, the value of the quantization parameter QP of the target macroblock is equal to the value of the externally supplied quantization parameter QPinput (step S702).

On the other hand, when the left-side macroblock is a skip macroblock, the value of the quantization parameter QP of the target macroblock is set to a value smaller than the value of the externally supplied quantization parameter QPinput (S703).

Consequently, even in the intra-frame predictive coding in which coding of a difference between a target frame and a reference frame is not carried out, a still portion of an image can be predicted to reduce the quantization parameter value, whereby coding can be carried out with high image quality while suppressing an increase in the amount of codes. Further, when this method is combined with the image coding method of the apparatus shown in FIG. 1 or 5, even in a frame to be subjected to still frame coding, high image quality coding with less coding errors can be carried out by varying quantization parameter.

Embodiment 2

Hereinafter, an image coding apparatus and an image coding method according to a second embodiment of the present invention will be described.

Figure 9:
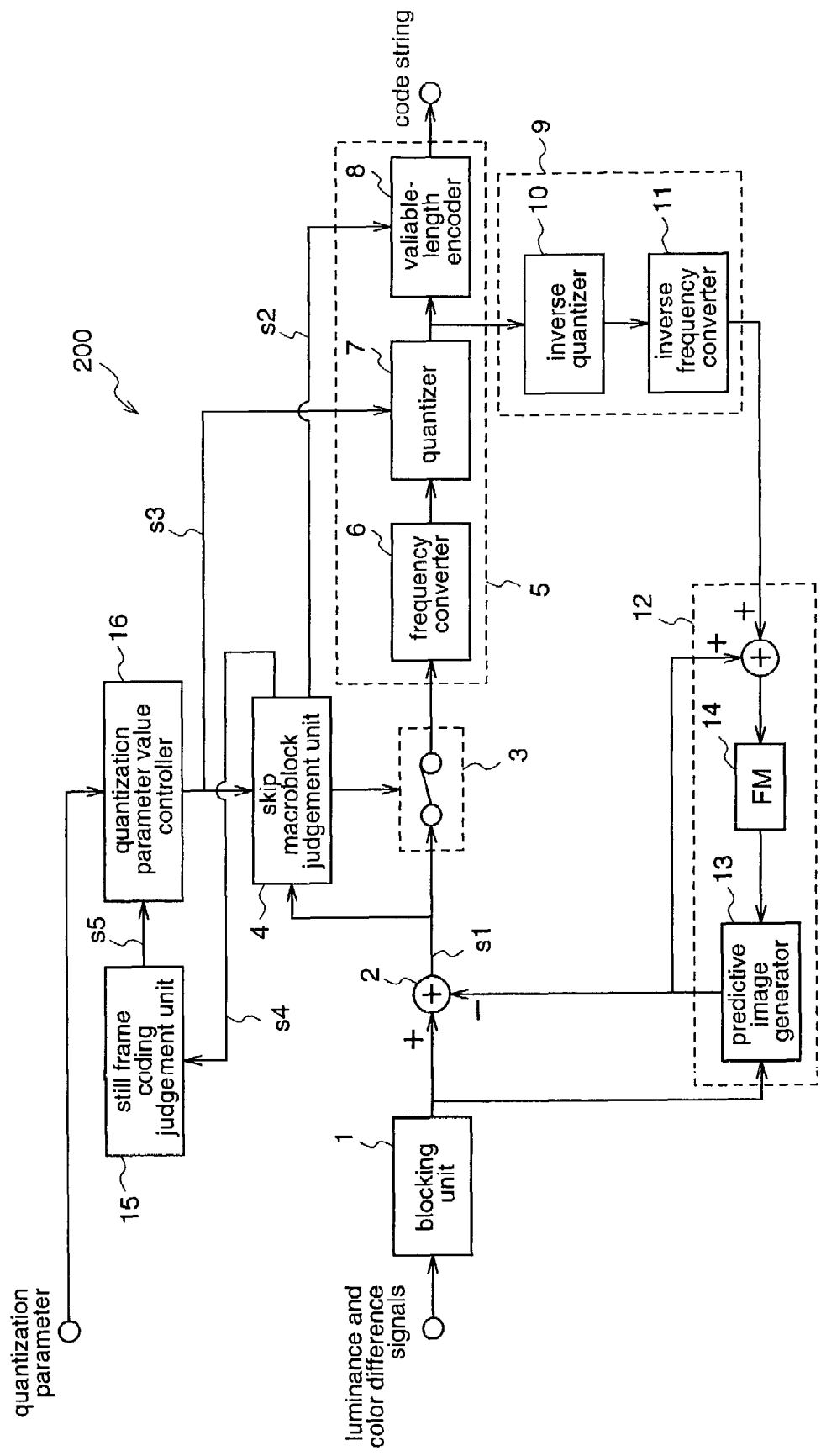
FIG. 9 is a block diagram for explaining an image coding apparatus according to a second embodiment of the present invention.

An image coding apparatus 200 according to the second embodiment has a construction as shown in FIG. 9. The image coding apparatus 200 determines a still frame in an image to be coded, and subjects a frame positioned two frames after a frame which starts to come into a standstill, to a coding process that realizes higher image quality (still frame coding) as compared coding for other frames.

The image coding apparatus 200 according to this second embodiment is different from the image coding apparatus 100 according to the first embodiment performing one-pass coding reside, in processing performed by the still frame coding judgement unit 15 for judging whether still frame coding should be carried out or not, and in processing performed by the quantization parameter value controller 16. Hereinafter, these differences will be described with reference to FIGS. 10 and 12.

Figure 10:
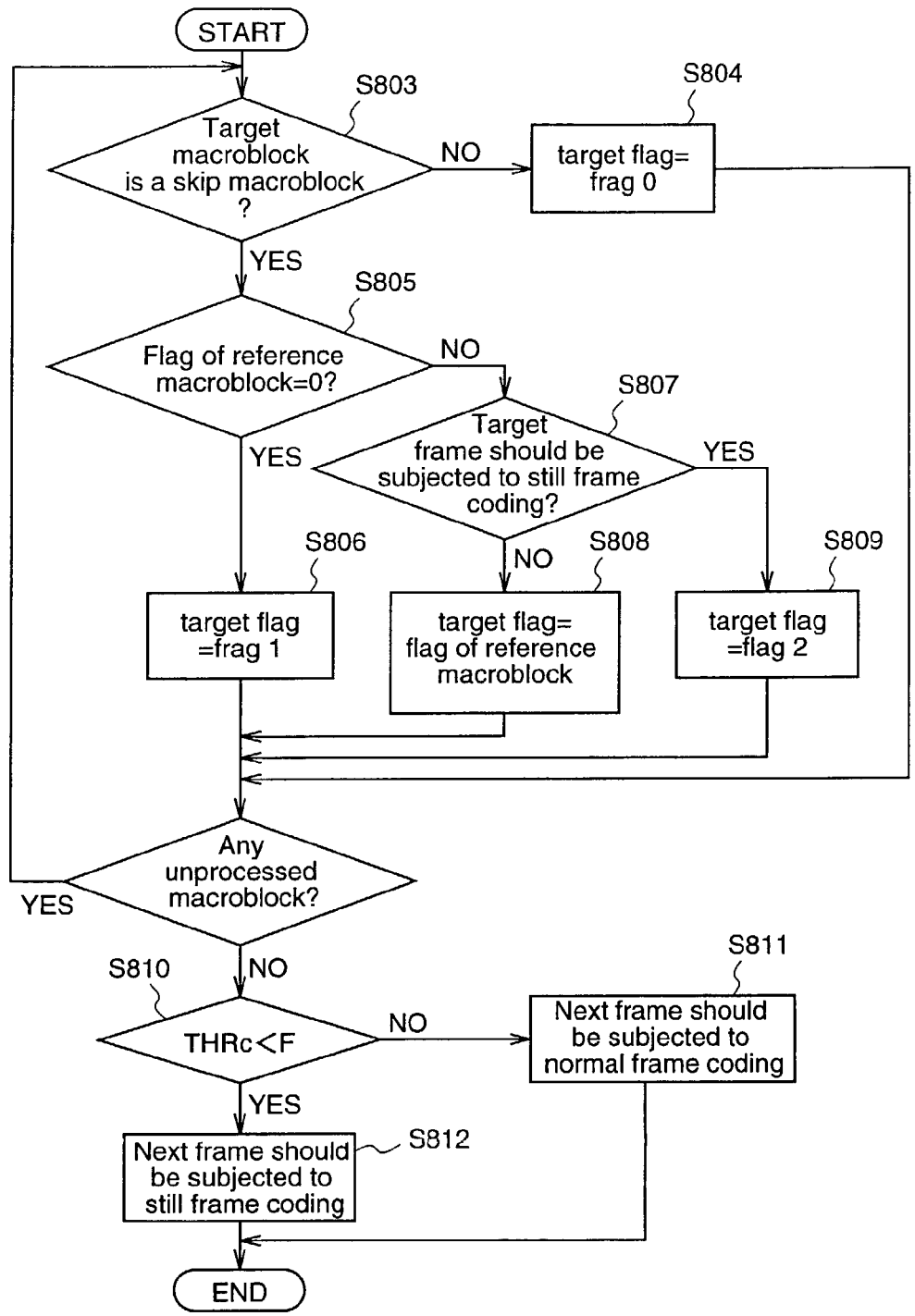
FIG. 10 is a flowchart illustrating a process of judging whether still frame coding should be carried out or not, by the image coding apparatus according to the second embodiment.

Initially, a still frame coding judgement method by the still frame coding judgement unit 15 according to the second embodiment will be described with reference to FIG. 10. For still frame coding judgement, a ternary flag indicating the coding method (coding type) of the target macroblock is employed. This flag is assigned to every macroblock as a unit of coding, and is referred to when coding a next frame. In FIG. 10, flag 0 indicates a case where the target macroblock is not a skip macroblock, flag 1 indicates a case where the target macroblock is a macroblock which has not yet been subjected to still frame coding in a past coded frame, and this macroblock a skip macroblock, and flag 2 indicates a case where the target macroblock is a macroblock which has already been coded in the past coded frame, and this macroblock is a skip macroblock.

When coding of the target frame is started, initially, the still frame coding judgement unit 15 judges whether the target macroblock is a skip macroblock or not, on the basis of an output s4 from the skip macroblock judgement unit 4 (step S803).

When the target macroblock is not a skip macroblock, the flag value of the target macroblock is set to 0 (step S804).

When the target macroblock is a skip macroblock, the flag value of the reference macroblock is referred to (step S805). When the flag value is 0, the flag value of the target macroblock is set to 1 (step S806). When the flag value is not 0, it is judged whether the target frame should be subjected to still frame coding or not (step S807).

When the result of judgement in step S807 indicates that the target frame should not be subjected to still frame coding, the flag value of the target macroblock is set to the flag value of the reference macroblock (step S808). When the target frame should be subjected to still frame coding, the flag value of the target macroblock is set to 2 (step S809). This process is carried out in coding all macroblocks in the target frame and, when all macroblocks in the target frame have been coded, it is judged whether the number F of macroblocks whose flag values are 1 is larger than a threshold value THRc or not (step S810). The threshold value THRc is obtained by multiplying the total number of macroblocks in the target frame with a value $\delta(0<\delta<1)$ that is determined by a prescribed method.

When, in step S810, the number F of macroblocks whose flag values are 1 is larger than the threshold value THRc, a next target frame is to be subjected to still frame coding (step S812). Otherwise, the next target frame is to be subjected to normal coding (step S811).

Figure 11:
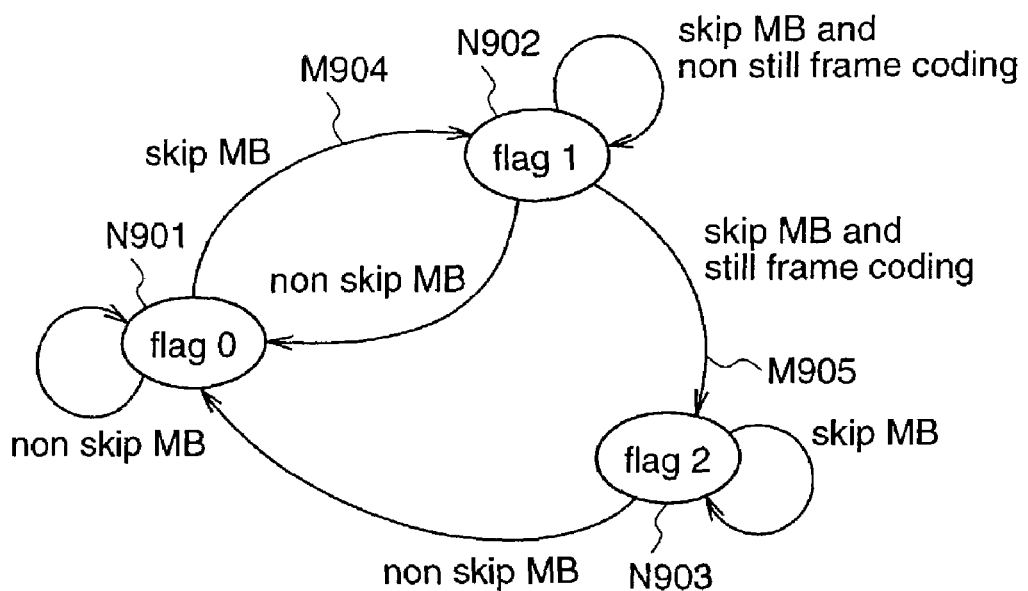
FIG. 11 is a state transition diagram illustrating state transition of a flag that is used in a process of judging whether still frame coding should be carried out or not, by the image coding apparatus according to the second embodiment.

FIG. 11 is a state transition diagram for explaining how the flag value of the above-mentioned ternary flag transits from the flag value of the reference macroblock according to the state of the target macroblock.

In the case where the flag value of the reference macroblock is 0 (N901), when the target macroblock is not a skip macroblock, the flag value of the target macroblock remains at 0. On the other hand, when the target macroblock is a skip macroblock (M904), the flag value of the target macroblock becomes 1 (N902).

In the case where the flag value of the reference macroblock is 1 (N902), when the target macroblock is a skip macroblock and the target frame should not be subjected to still frame coding, the flag value of the target macroblock remains at 1. On the other hand, when the target macroblock is a skip macroblock and the target frame should be subjected to still frame coding (M905), the flag value of the target macroblock becomes 2 (N903). Further, when the target macroblock is not a skip macroblock, the flag value of the target macroblock becomes 0 (N901).

In the case where the flag value of the reference macroblock is 2 (N903), when the target macroblock is a skip macroblock, the flag value of the target macroblock remains at 2. On the other hand, when the target macroblock is not a skip macroblock, the flag value of the target macroblock becomes 0 (N901).

As described above, the still frame coding judgement unit 15 obtains the signal s4 indicating the coding method for the target macroblock (i.e., a signal indicating whether the target macroblock is a skip macroblock or not) from the skip macroblock judgement unit 4, and further, judges whether the next target frame should be subjected to still frame coding or not, by using the flag value indicating the coding method that is determined in coding the previous frame, and the flag value given to the reference macroblock and indicating the coding method for the reference macroblock. When coding the target frame, the result determined in coding the previous frame is used.

The values of the ternary flag described with respect to FIGS. 10 and 11 are not restricted to 0, 1, and 2.

Figure 12:
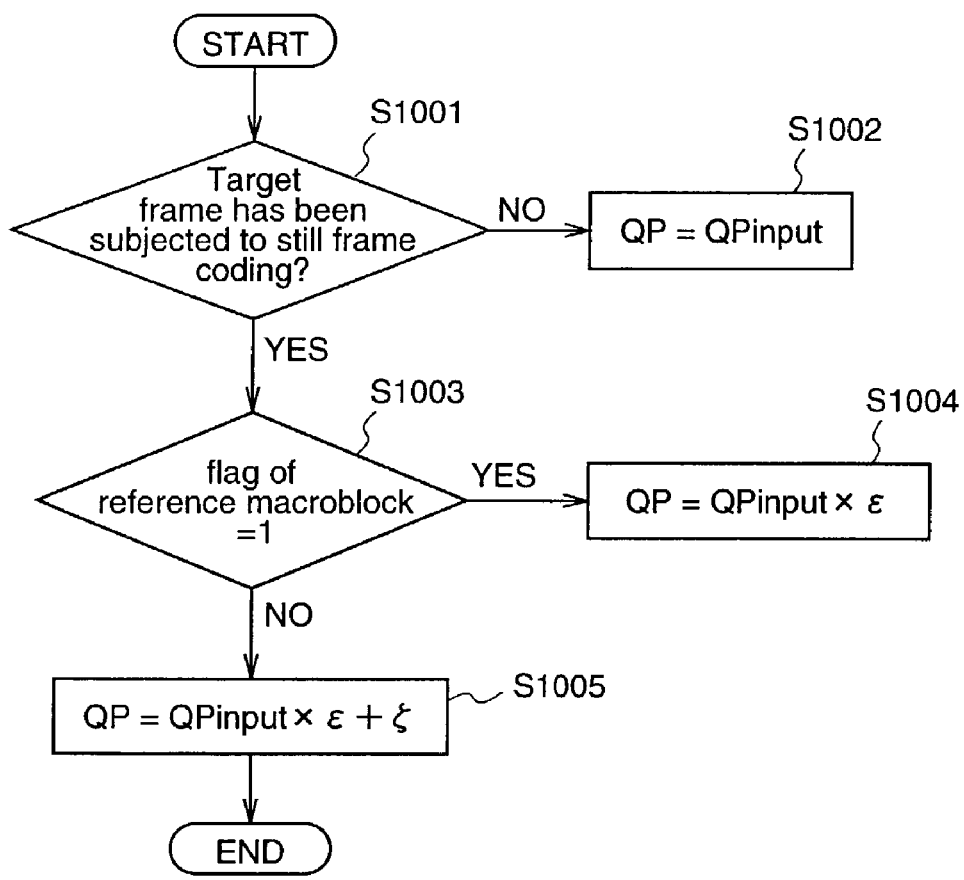
FIG. 12 is a flowchart illustrating a process of controlling a quantization parameter value by the image coding apparatus according to the second embodiment.

Next, a quantization parameter value control method employed by the quantization parameter value controller 16 according to the second embodiment will be described with reference to FIG. 12. Hereinafter, a description will be given of information as to whether the reference frame should be subjected to still frame coding or not, which information is stored in the still frame coding judgement unit 15, and the quantization parameter value to be controlled by the flag value of the reference macroblock.

The quantization parameter value controller 16 starts to control the quantization parameter value on receipt of the flag value of the reference macroblock that is determined by the still frame coding judgement unit 15, the signal s5 indicating whether the reference frame should be subjected to still frame coding or not, and the externally supplied quantization parameter.

Initially, it is judged whether the target frame should be subjected to still frame coding or not, on the basis of the output signal s5 from the still frame coding judgement unit 15 (step S1001). When it is judged that the target frame should not be subjected to still frame coding, the externally supplied quantization parameter value QPinput is used as the quantization parameter value QP of the target macroblock (step S1002). On the other hand, when the target frame should be subjected to still frame coding, it is judged whether the flag value of the reference macroblock is 0 (non-skip macroblock) or not (step S1003).

When it is judged in step S1003 that the flag value of the target macroblock is not 0, the quantization parameter value of the target macroblock is set to a value which is obtained by multiplying the externally inputted quantization parameter value QPinput with a value $\epsilon(0<\epsilon<1)$ that is determined by a prescribed method (step S1004). When the flag value of the reference macroblock is 0, the quantization parameter value of the target macroblock is set to a value which is obtained by multiplying the externally inputted quantization parameter value QPinput with a value $\epsilon(0<\epsilon<1)$ determined by a prescribed method, and adding a value $\xi(0<\xi)$ determined by a prescribed method to the result of multiplication (step S1005).

As described above, the quantization parameter value controller 16 controls the externally inputted quantization parameter value on the basis of the output s5 from the still frame coding judgement unit 15 and, when coding of the target macroblock is carried out using, as a reference macroblock, a macroblock which has not been subjected to still frame coding before coding of the previous frame, it is judged that the target macroblock is a macroblock in a frame two frames after a frame at which the image starts to come into a standstill, whereby the quantization parameter value QP can be set to a value smaller than the quantization parameter value QPinput that is externally supplied in normal frame coding. Further, when a macroblock which has already been subjected to still frame coding is referred to, since this reference macroblock has already been subjected to coding with less coding error, the coding error is hardly increased even when the quantization parameter value is set to a value larger than QPinput×ϵ.

In MPEG-4 standard, it is defined that variations in the quantization parameter value of a macroblock should be within a range of ±2. That is, only ±2 is allowed for a difference in quantization parameter values between adjacent macroblocks, a difference in the quantization parameter value QP for every macroblock, which value varies according to $\epsilon$ and $\xi$, should be controlled so as to be any of +2, +1, 0, −1, and −2.

Considering that the amount of codes to be generated is increased when the quantization parameter value is controlled to be a small value, the quantization parameter value QP of a macroblock which should not be subjected to still frame coding (step S1005) may be set to a value equal or close to the externally inputted quantization parameter value QPinput.

In the image coding apparatus 200, instead of the output s3 from the quantization parameter value controller 16, the externally inputted quantization parameter value may be used as the quantization parameter value for difference coding in the quantizer 7.

Furthermore, when the skip macroblock coding judgement unit 4 judges whether the target macroblock is a skip macroblock or not, the output of the still frame coding judgement unit 15 may be used as described with respect to the image coding apparatus 110 shown in FIG. 5.

Furthermore, while in this second embodiment it is judged whether each macroblock is standing still or not using a flag, this judgement may be performed for another unit. For example, it may be performed for each of four sections into which a frame is divided, or for an arbitrary region.

In the image coding apparatus 200 according to the second embodiment, each macroblock is assigned a flag indicating whether this macroblock should be subjected to still frame coding or not, and judgement as to whether a next target frame should be subjected to still frame coding or not can be easily carried out on the basis of the coding method of the reference frame, the flag value of the reference macroblock, and the state of the target macroblock (i.e., whether it is a skip macroblock or not, whether it should be subjected to still frame coding or not). Further, since the quantization parameter value is controlled in units of macroblocks, coding can be carried out with minimized coding error in judgement as to whether the target macroblock is a skip macroblock or not, and in quantization at difference coding.

The coded image data (bit stream) obtained by the image coding apparatus 200 according to the second embodiment has the following characteristics.

Since a frame next to a frame which starts to come into a standstill (standstill starting frame) is surely coded with high image quality by the image coding apparatus 200, the coded bit stream is characterized by that the quantization parameter value of the frame immediately after the standstill starting frame becomes smaller than those of other P frames, and a frame immediately after the frame having the small quantization parameter value has a high rate of skip macroblocks, as compared with the bit stream obtained by the conventional image coding apparatus. The reason is as follows. As the image quality of the frame which has been subjected to high image quality coding is higher, the difference value becomes smaller in coding the subsequent still frame, whereby the rate of skip macroblocks is increased. As a result, the image quality of the subsequent frame can be improved.

Furthermore, when the frame immediately after the standstill starting frame is coded as an I frame by the image coding apparatus 200, the coded bit stream is characterized by that the frame immediately after the standstill starting frame is surely coded as an I frame. Since the image quality of an I frame is higher than that of a P frame, the image quality obtained by this coding method is improved as compared with that obtained by still frame coding.

Furthermore, when the quantization parameter value is controlled by the image coding apparatus 200 such that it is reduced in the frame immediately after the standstill starting frame and, thereafter, increased to be larger than the normal value in the subsequent still frame, whereby the coded bit stream is characterized by that the quantization parameter value is large in the subsequent still frame of the still image. When the quantization parameter value of the subsequent still frame is increased, the number of skip macroblocks is increased, and an image subjected to still frame coding is displayed, whereby a high-quality image can be displayed. Further, the amount of codes generated per frame is increased when the frame immediately after the standstill starting frame is coded as a still frame with the quantization parameter value being reduced, but by contrast, the amount of codes generated per frame is reduced when the quantization parameter value is increased in the subsequent still frame. Therefore, the amount of generated codes is averaged between the still images, and the average amount of generated codes (bit rate) becomes approximately constant.

The coded image data (bit stream) having the above-described characteristics can be decoded by an image decoding apparatus which is commonly used, and further, an image of higher quality can be reproduced as compared with the bit stream obtained by the conventional image coding apparatus. Further, the image decoding apparatus may perform, not the conventional image decoding process described above, but an image decoding process as follows. That is, in decoding the subsequent still frame, when the number of skip macroblocks exceeds a number that is obtained with respect to the total number of macroblocks by a predetermined method, the image decoding apparatus judges this frame as a skip frame not to be displayed, and starts decoding of a next frame. Thereby, a high-quality image can be reproduced and, moreover, the amount of arithmetic in the decoding process can be reduced.

Furthermore, the image standstill judgement (judgement as to whether an image is standing still or not) using the flag shown in this second embodiment and the method of coding the image with high image quality using the judgement result, are not applied to a frame (B frame) to be subjected to bidirectional predictive coding (coding with reference to a past frame or a future frame), that is, the B frame is subjected to normal coding in which updation of flag and accompanying control of quantization parameter are not carried out, whereby an increase in the amount of codes to be generated can be suppressed in the B frame which is not to be used as a predictive image (which is not to be referred to in coding a subsequent frame). Then, a P frame two frames after a frame that starts to come into a standstill (i.e., a frame to be referred to by a subsequent frame) is coded as a still frame with high image quality, whereby the image quality of the subsequent frame which refers to the P frame subjected to still frame coding is improved.

Moreover, when the target frame is a B frame and is judged as a frame to be subjected to still frame coding, the target frame is coded with high image quality, using the quantization parameter that is controlled to be smaller than usual. However, when updation of the flag is not carried out, the B frame which refers to the frame judged as a still frame is subjected to still frame coding (coding with high image quality), and a next P frame to be a reference frame for a subsequent frame is also subjected to still frame coding, whereby the image quality of subsequent still frames can be also improved.

The image coding method according to the second embodiment can be incorporated into standardized image coding methods such as MPEG-2, MPEG-4, H.261, H.263, and the like. However, in MPEG-4 standard, it is defined that variations in a quantization parameter value of a macroblock should be within a range of ±2.

Embodiment 3

Hereinafter, an image coding apparatus and an image coding method according to a third embodiment of the present invention will be described.

Figure 13:
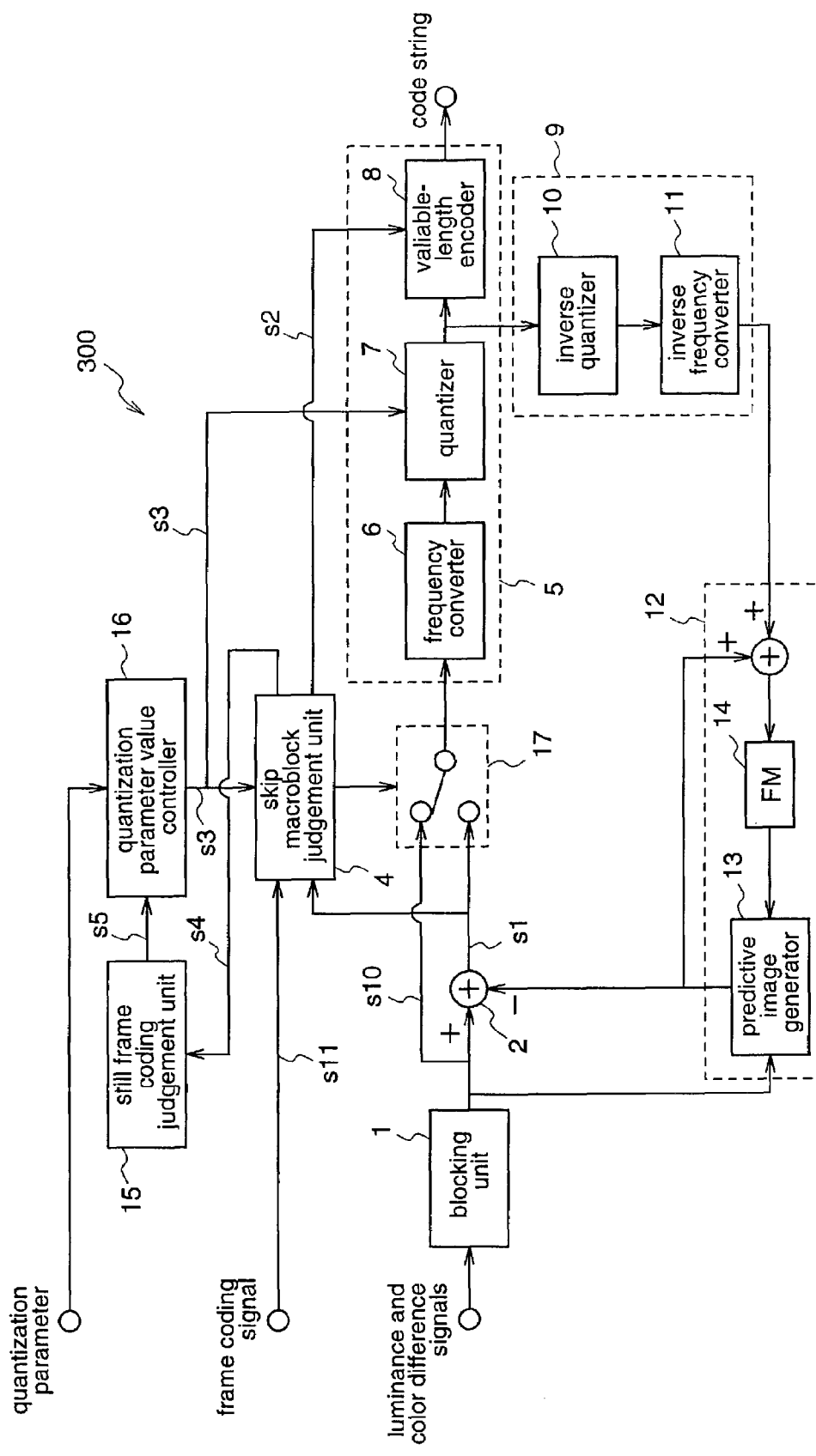
FIG. 13 is a block diagram for explaining an image coding apparatus according to a third embodiment of the present invention.
Figure 14:
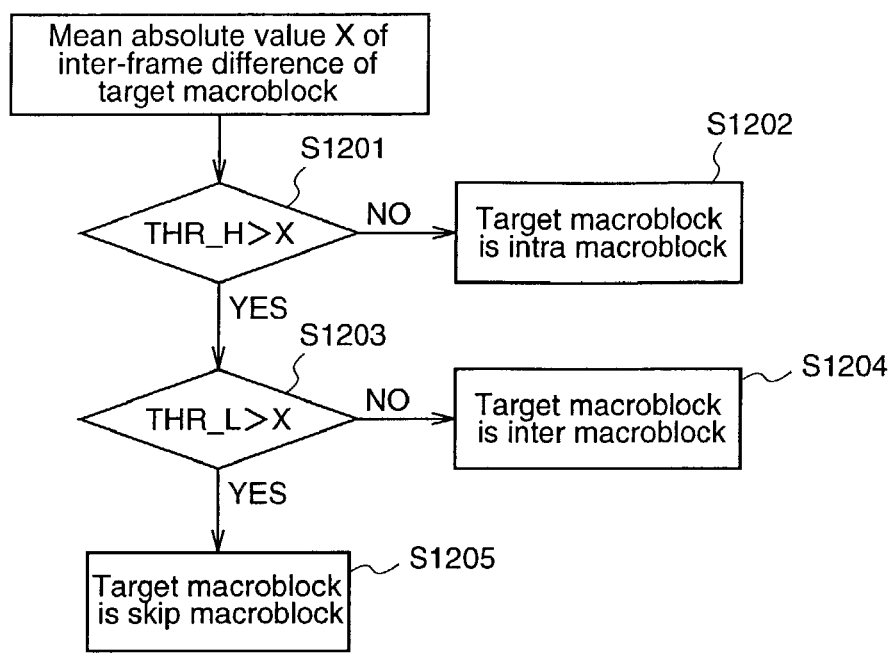
FIG. 14 is a flowchart illustrating a process of determining a skip macroblock by the image coding apparatus according to the third embodiment.

An image coding apparatus 300 according to this third embodiment has a construction as shown in FIG. 13. The image coding apparatus 300 determines a still frame in an image to be coded, and subjects a frame two frames after a frame that starts to come into a standstill, to a coding process which provides higher image quality (still frame coding) as compared with coding for other frames.

The image coding apparatus 300 according to the third embodiment is different from the image coding apparatus 200 according to the second embodiment in processing performed by the still frame coding judgement unit 15 that judges whether still frame coding should be performed or not, and in processing performed by the skip macro block judgement unit 4. Therefore, only these differences will be described hereinafter.

Initially, the operation of the skip macroblock judgement unit 4 according to the third embodiment will be described.

On receipt of a frame coding signal s11 indicating a coding method for a target frame, which is supplied from the outside, the skip macroblock judgement unit 4 starts a skip macroblock judgement process.

When the input signal s11 is a signal indicating a frame to be subjected to intra-frame predictive coding (I frame), the switch 17 is controlled so that an image signal s10 outputted from the blocking unit 1 is output to the compressive coding unit 5, and the image signal s10 is compressively coded by the compressive coding unit 5.

Further, when the input signal s11 is a signal which does not indicate an I frame, the mean absolute value X of the difference value s1 of the target macroblock, which is output from the subtracter 2, is compared with a threshold value THR_H that is determined by a prescribed method (step S1201). The threshold value THR_H is obtained by multiplying the quantization parameter value s3 with a value α1 (0<α1<1).

When the mean absolute value X of the difference value s1 is larger than the threshold value THR_H, the target macroblock is determined as an intra macroblock (step S1202). Thereby, the output signal s10 from the blocking unit 1 is compressively coded by the compressive coding unit 5.

On the other hand, when the mean absolute value X of the difference value s1 is smaller than the threshold value THR_H, the mean absolute value X is compared with a threshold value THR_L that is determined by a prescribed method (S1203). The threshold value THR_L is obtained by multiplying the quantization parameter value s3 with a value α2 (0<α2<1).

When, in step S1203, the mean absolute value X of the difference value s1 is larger than the threshold value THR_L, the target block is judged as an inter macroblock (step S1204).

Thereby, the output s1 from the subtracter 2 is compressively coded by the compressive coding unit 5.

When, in step S1203, the mean absolute value X of the difference value s1 is smaller than the threshold value THR_L, the target block is judged as a skip macroblock (step S1205). Thereby, the skip macroblock signal s2 is output to the variable length encoder 8.

As described above, the skip macroblock judgement unit 4 receives the externally inputted signal s11 indicating the frame coding method as to whether the target frame should be subjected to intra-frame predictive coding or inter-frame predictive coding, and the quantization parameter value s3 outputted from the quantization parameter value controller 16, and judges whether the target macroblock should be subjected to intra-frame predictive coding (intra macroblock) or inter-frame predictive coding (inter macroblock).

Figure 15:
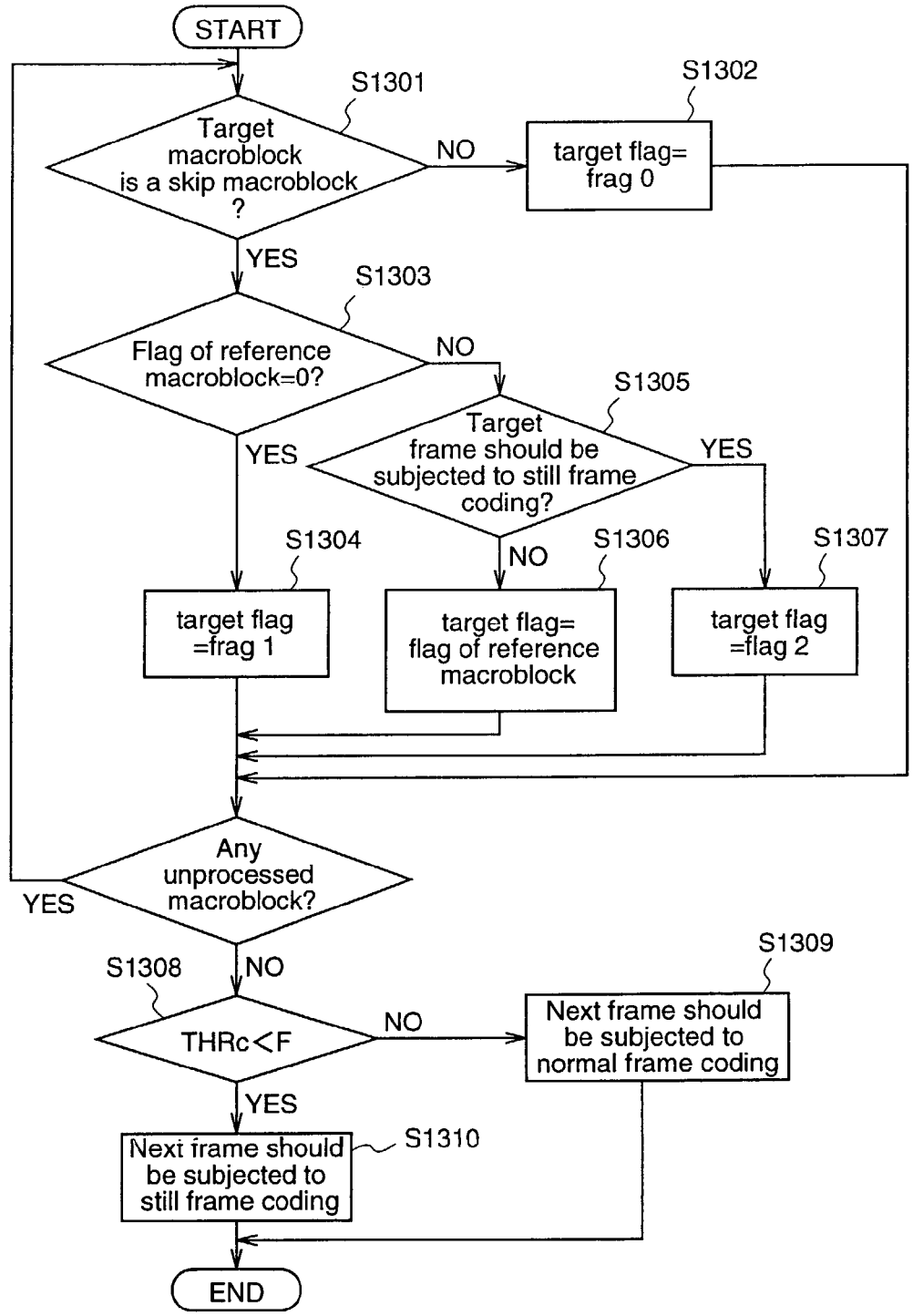
FIG. 15 is a flowchart illustrating a process of judging whether still frame coding should be carried out or not, by the image coding apparatus according to the third embodiment.

Next, a description will be given of the operation of the still frame coding judgement unit 15 in the image coding apparatus 300 according to the third embodiment, with reference to FIG. 15. A flag used in FIG. 15 is a ternary flag indicating the coding method (coding type) for the target macroblock, and this flag is identical to that described with respect to the second embodiment. The values of the ternary flag shown in FIG. 15 are not restricted to 0, 1, and 2.

When coding of the target frame is started, initially, the still frame coding judgment unit 15 judges whether the target macroblock is a skip macroblock or not, using the output s4 of the skip macroblock judgement unit 4 (step S1301).

When the target macroblock is not a skip macroblock, the flag value of the target macroblock is set to 0 (step S1302).

On the other hand, when the target macroblock is a skip macroblock, the flag value of the reference macroblock is referred to (step S1303). When the flag value of the reference macroblock is 0, the flag value of the target macroblock is set to 1 (step S1304); otherwise, it is judge whether the target frame is a frame to be subjected to still frame cording or not (step S1305). When the target frame is not a frame to be subjected to still frame coding, the flag value of the macroblock is made equal to the flag value of the reference macroblock (step S1306). When the target frame is a frame to be subjected to still frame coding, the flag value of the target macroblock is set to 2 (step S1307).

The above-mentioned processing is carried out in coding all macroblocks in the target frame, i.e., it is repeated until coding of all macroblocks in the target frame is completed.

When coding of all macroblocks is completed, it is judged whether the number F of macroblocks whose flag values are 1 is larger than a threshold value THRc or not (step S1308). The threshold value THRc is a value obtained by multiplying the number of all macroblocks in the target frame with a value $\delta(0<\delta<1)$.

When, in step S1308, the number F of macroblocks whose flag values are 1 is larger than the threshold value THRc, it is determined that a next target frame should be subjected to still frame coding (step S1310); otherwise, it is determined that a next target frame should be subjected to normal coding (step S1309).

As described above, the still frame coding judgement unit 15 obtains the coding method for the target macroblock (whether the target macroblock is a skip macroblock or not) from the output of the skip macroblock judgement unit 4, and further, judges whether the next target frame should be subjected to still frame coding or not, using the coding method for the target frame (whether the target frame is a still frame or not) which is determined in coding the immediately-previous frame and is stored in the still frame coding judgement unit 15, and the flag value which is given to the reference macroblock and indicates the coding method (coding type) of the macroblock. When coding the target frame, the still frame coding judgement unit 15 uses the result determined in coding the previous frame.

In the image coding apparatus 300, the quantization parameter to be used in the difference coding by the quantizer 7 may be the externally inputted quantization parameter value.

Further, in coding the target macroblock, when the skip macroblock judgement unit 4 judges whether the target macroblock should be a skip macroblock or not, the output of the still frame coding judgement unit may be used as described with respect to the image coding apparatus 110 shown in FIG. 5.

In the image coding apparatus according to the third embodiment, each macroblock is assigned a flag indicating whether this macroblock should be subjected to still frame coding or not, and it can be easily judged whether a next target frame should be subjected to still frame coding or not, from the coding method of the reference frame, the flag value of the reference macroblock, and the state of the target macroblock (whether the target macroblock is a skip macroblock or not, whether the target macroblock should be subjected to still frame coding or not). Further, since the quantization parameter value is controlled in units of macroblocks, coding can be carried out with minimized coding error in judgement as to whether the target macroblock is a skip macroblock or not, and in quantization at difference coding. Further, since the above-described still frame coding is not applied to a frame and a macroblock to be subjected to intra-frame predictive coding, the amount of codes to be generated in coding can be reduced without reducing the quantization scale.

In the image coding apparatus according to the third embodiment, when the signal indicating the frame coding method, which is supplied from the outside, is a signal indicating intra-frame predictive coding (I frame), if the target frame is judged as a still frame, the target frame is not coded as an I frame but subjected to inter-frame predictive coding, whereby degradation in image quality is suppressed because the reference image is high image quality data, and further, the amount of codes to be generated can be reduced.

The coded image data (bit stream) obtained by the image coding apparatus 300 has the following characteristics.

Since a frame next to a frame which starts to come into a standstill (standstill starting frame) is surely coded with high image quality by the image coding apparatus 300, the coded bit stream is characterized by that the quantization parameter value of the frame immediately after the standstill starting frame becomes smaller than those of other P frames, and a frame immediately after the frame having the small quantization parameter value has a high rate of skip macroblocks, as compared with the bit stream obtained by the conventional image coding apparatus. The reason is as follows. As the image quality of the frame which has been subjected to high image quality coding is higher, the difference value becomes smaller in coding the subsequent still frame, whereby the rate of skip macroblocks is increased. As a result, the image quality of the subsequent frame can be improved.

Furthermore, when the frame immediately after the standstill starting frame is coded as an I frame by the image coding apparatus 300, the coded bit stream is characterized by that the frame immediately after the standstill starting frame is surely coded as an I frame. Since the image quality of an I frame is higher than that of a P frame, the image quality obtained by this coding method is improved as compared with that obtained by still frame coding.

Furthermore, when the quantization parameter value is controlled by the image coding apparatus 300 such that it is reduced in the frame immediately after the standstill starting frame and, thereafter, increased to be larger than the normal value in the subsequent still frame, whereby the coded bit stream is characterized by that the quantization parameter value is large in the subsequent still frame of the still image. When the quantization parameter value of the subsequent still frame is increased, the number of skip macroblocks is increased, and an image subjected to still frame coding is displayed, whereby a high-quality image can be displayed. Further, the amount of codes generated per frame is increased when the frame immediately after the standstill starting frame is coded as a still frame with the quantization parameter value being reduced, but by contrast, the amount of codes generated per frame is reduced when the quantization parameter value is increased in the subsequent still frame. Therefore, the amount of generated codes is averaged between the still images, and the average amount of generated codes (bit rate) becomes approximately constant.

Furthermore, in the image coding apparatus 300, when the target frame is judged as a still frame, inter-frame predictive coding may be carried out even when an instruction of I-frame coding (intra-frame coding) is externally inputted, whereby no I frames are inserted in the subsequent still frames over which the standstill state of the image continues. Since, in this case, the image quality of the reference images is improved, degradation in image quality is avoided, and the amount of codes to be generated is reduced.

The coded image data (bit stream) having the above-described characteristics can be decoded by an image decoding apparatus which is commonly used, and further, an image of higher quality can be reproduced as compared with the bit stream obtained by the conventional image coding apparatus. Further, the image decoding apparatus may perform, not the conventional image decoding process described above, but an image decoding process as follows. That is, in decoding the subsequent still frame, when the number of skip macroblocks exceeds a number that is obtained with respect to the total number of macroblocks by a predetermined method, the image decoding apparatus judges this frame as a skip frame not to be displayed, and starts decoding of a next frame. Thereby, a high-quality image can be reproduced and, moreover, the amount of arithmetic in the decoding process can be reduced.

The image coding method according to the third embodiment may be incorporated into standard image coding methods such as MPEG-2, MPEG-4, H.261, H263, and the like. However, it is defined in MPEG-4 standard that variations of quantization parameter value of a macroblock is within a range of ±2.

While in the first to third embodiments an image is inputted frame by frame, the present invention is not restricted thereto. For example, an image may be inputted field by field with the same effects as mentioned above.

Further, while in the first to third embodiments the image coding method according to the present invention is implemented by hardware, it may be implemented by software.

What is claimed is:

1. An image coding method performed by an apparatus comprising:
    a still frame judgment step of judging whether or not a target frame to be coded is a still frame;
    a still frame coding judgment step of judging whether a frame after the target frame is to be subjected to still frame coding or normal frame coding, the still frame coding having a higher image quality than the normal frame coding, on the basis of coding information of the target frame that is determined in coding a frame previous to the target frame;
    a quantization parameter value control step of controlling a quantization scale of an externally inputted quantization parameter, on the basis of an output from the still frame judgment step;
    a skip macroblock judgment step of judging whether each macroblock in the target frame is a skip macroblock or not, by using the quantization parameter controlled in the quantization parameter value control step, and a difference value between the target frame and a reference frame; and
    a coding step of determining a coding method of the frame after the target frame on the basis of the judgment by the still frame coding judgment step, and coding the target frame on the basis of the coding information that is determined in coding the previous frame,
    wherein the coding step includes a high image quality coding step of subjecting any macroblock among a plurality of macroblocks located at a same position in a plurality of continuous frames which are judged as still frames in the still frame judgment step, to at least one-time still frame coding having a higher image quality relative to coding for other macroblocks.

2. An image coding method as defined in claim 1, wherein the high image quality coding step does not perform the high image quality coding on an I frame to be subjected to only intra-frame predictive coding.

3. An image coding method as defined in claim 1, wherein the high image quality coding step does not perform the high image quality coding on a macroblock to be subjected to intra-frame predictive coding.

4. An image coding apparatus comprising:
    a still frame judgment unit for judging whether or not a target frame to be coded is a still frame;
    a still frame coding judgment unit for judging whether a frame after the target frame is to be subjected to still frame coding or normal frame coding, the still frame coding having a higher image quality than the normal frame coding, on the basis of coding information of the target frame that is determined in coding a frame previous to the target frame;
    a quantization parameter value control unit for controlling a quantization scale of an externally inputted quantization parameter, for each macroblock, on the basis of an output from the still frame judgment unit;
    a skip macroblock judgment unit for judging whether each macroblock in the target frame is a skip macroblock or not, by using the quantization parameter controlled by the quantization parameter value control unit, and a difference value between the target frame and a reference frame; and
    a coding unit for performing coding of the target frame while determining a coding method for each macroblock in a frame next to the target frame on the basis of the judgment by the still frame judgment unit and the judgment by the skip macroblock judgment unit, wherein any macroblock among a plurality of macroblocks located at a same position in a plurality of continuous frames which are judged as still frames in the still frame coding judgment unit, is subjected to at least one-time still frame coding having a higher image quality relative to coding for other macroblocks.

5. An image coding apparatus as defined in claim 4, wherein the coding unit performs the coding by using the quantization parameter that is controlled by the quantization parameter value control unit.

6. An image coding apparatus as defined in claim 4, wherein
the skip macroblock judgment unit starts the judging upon receipt of a frame coding signal indicating a coding method of the target frame, the frame coding signal being supplied from outside, and
the coding unit performs coding of each macroblock in the target frame when the frame coding signal indicates intra-frame predictive coding, and performs coding of the difference value when the frame coding signal does not indicate intra-frame predictive coding.

7. An image coding apparatus comprising:
a skip macroblock judgment unit for judging whether each macroblock in a target frame is a skip macroblock or not, by using a difference value between the target frame and a reference frame and an externally inputted quantization parameter;
a still frame coding judgment unit for judging whether a frame after the target frame is to be subjected to still frame coding or normal frame coding, the still frame coding having a higher image quality than the normal frame coding, on the basis of coding information of the target frame that is determined in coding a frame previous to the target frame; and
a coding unit for performing coding of the target frame while determining a coding method for each macroblock in a frame next to the target frame on the basis of the judgment by the still frame coding judgment unit and the judgment by the skip macroblock judgment unit, wherein any macroblock among a plurality of macroblocks located at a same position in a plurality of continuous frames which are judged as still frames in the still frame coding judgment unit, is subjected to at least one-time still frame coding having a higher image quality relative to coding for other macroblocks.

8. An image coding apparatus as defined in claim 7, further comprising
a quantization parameter value control unit for controlling a quantization scale of an externally inputted quantization parameter, on the basis of the coding method determined in the still frame coding judgment unit, wherein
said coding unit performs the coding by using the quantization parameter that is controlled by the quantization parameter value control unit.

9. An image coding apparatus as defined in claim 7, wherein
the skip macroblock judgment unit starts the judging upon receipt of a frame coding signal indicating a coding method of the target frame, the frame coding signal being supplied from outside, and
the coding unit performs coding of each macroblock in the target frame when the frame coding signal indicates intra-frame predictive coding, and performs coding of the difference value when the frame coding signal does not indicate intra-frame predictive coding.

* * * * *